United States Patent
Dybdal et al.

(10) Patent No.: US 9,065,521 B1
(45) Date of Patent: Jun. 23, 2015

(54) SYSTEMS AND METHODS FOR REDUCING NARROW BANDWIDTH AND DIRECTIONAL INTERFERENCE CONTAINED IN BROAD BANDWIDTH SIGNALS

(71) Applicant: The Aerospace Corporation, El Segundo, CA (US)

(72) Inventors: Robert B. Dybdal, Palos Verdes Estates, CA (US); Christopher J. Clark, Hermosa Beach, CA (US); Don J. Hinshilwood, Rolling Hills Estates, CA (US); Lan Xu, Cerritos, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 14/453,949

(22) Filed: Aug. 7, 2014

(51) Int. Cl.
*H03D 1/04* (2006.01)
*H04B 1/10* (2006.01)

(52) U.S. Cl.
CPC .......................... *H04B 1/10* (2013.01)

(58) Field of Classification Search
CPC ... H04L 27/2647; H04L 1/20; H04L 11/0066; H04B 1/1027; H04B 1/123; H04B 1/1036; H04B 15/00; H04J 11/0066
USPC ........................... 375/346; 370/210, 536, 542
See application file for complete search history.

(56) References Cited

U.S. PATENT DOCUMENTS

| | | | |
|---|---|---|---|
| 4,351,062 A * | 9/1982 | Yoshiya | 375/346 |
| 5,029,184 A * | 7/1991 | Andren et al. | 375/138 |
| 5,263,048 A | 11/1993 | Wade | |
| 5,440,308 A | 8/1995 | Dybdal et al. | |
| 5,479,440 A | 12/1995 | Esfahani | |
| 5,511,010 A * | 4/1996 | Burns | 702/108 |
| 5,671,247 A * | 9/1997 | Souissi et al. | 375/144 |
| 5,739,788 A | 4/1998 | Dybdal et al. | |
| 6,868,114 B2 * | 3/2005 | Bially et al. | 375/148 |
| 6,975,673 B1 | 12/2005 | Rouquette | |
| 7,209,567 B1 * | 4/2007 | Kozel et al. | 381/94.3 |
| 7,277,475 B1 | 10/2007 | Nguyen et al. | |
| 7,366,243 B1 * | 4/2008 | McCrady | 375/259 |
| 7,573,947 B2 * | 8/2009 | Arad | 375/295 |
| 7,860,476 B1 * | 12/2010 | Karr et al. | 455/296 |

(Continued)

OTHER PUBLICATIONS

Dybdal et al., "An uplink antenna for electronic beam steering and interference reduction," 2002 IEEE AP-S Symposium Digest, San Antonio, TX, Jun. 16-21, 2002 (4 pages).

(Continued)

*Primary Examiner* — Juan A Torres
(74) *Attorney, Agent, or Firm* — Jones Day; Jaime D. Choi

(57) ABSTRACT

Under one aspect, a system includes circuitry that digitizes and Fourier transforms first and second beams and outputs first and second sets of spectral bins. Each bin may include a portion of a group of signals or interference. The circuitry compares the collective power levels of each set of spectral bins to a predetermined threshold, and excises at least one bin of that set that contains the interference if the collective power level of that set exceeds the predetermined threshold. The circuitry determines an angular location of the interference based on excised bins, combines remaining bins with weights selected to form a null in a pattern of the first and second beams that is aligned with the interference's angular location, and inversely Fourier transforms the combined remaining bins and outputs the group of signals less any interference that was excised or excluded by the null.

19 Claims, 10 Drawing Sheets

(56) References Cited

U.S. PATENT DOCUMENTS

| | | |
|---|---|---|
| 7,894,556 B2 | 2/2011 | Casabona et al. |
| 8,238,410 B2 | 8/2012 | Lennen |
| 8,614,940 B1 | 12/2013 | Dybdal et al. |
| 8,711,675 B1 | 4/2014 | Dybdal et al. |
| 2002/0094044 A1* | 7/2002 | Kolze et al. ............... 375/346 |
| 2005/0047487 A1 | 3/2005 | Sakaue et al. |
| 2006/0153283 A1* | 7/2006 | Scharf et al. ............. 375/148 |
| 2006/0291375 A1 | 12/2006 | Nishikawa |
| 2009/0257471 A1* | 10/2009 | Tanaka et al. ............ 375/130 |
| 2010/0195775 A1* | 8/2010 | Chamberlain ............ 375/350 |
| 2010/0198588 A1 | 8/2010 | Sudo et al. |
| 2011/0053546 A1* | 3/2011 | Hess et al. ............... 455/296 |
| 2011/0090939 A1 | 4/2011 | Diener et al. |
| 2012/0244819 A1 | 9/2012 | Tang |

OTHER PUBLICATIONS

Dybdal and Hinshilwood, "Deaden: a new adaptive cancellation technique," 1995 IEEE MILCOM Symposium Digest, San Diego, CA Nov. 5-8, 1995 (5 pages).

United States Patent and Trademark Office, Notice of Allowance issued in U.S. Appl. No. 13/676,645, mailed Sep. 12, 2013.

United States Patent and Trademark Office, Non Final Office Action issued in U.S. Appl. No. 13/676,645, mailed May 24, 2013.

United States Patent and Trademark Office, Notice of Allowance issued in U.S. Appl. No. 14/010,390, mailed Dec. 24, 2013.

United States Patent and Trademark Office, Non-Final Office Action issued in U.S. Appl. No. 14/010,390, mailed Nov. 18, 2013.

\* cited by examiner

SYSTEMS AND METHODS FOR REDUCING NARROW BANDWIDTH AND DIRECTIONAL INTERFERENCE CONTAINED IN BROAD BANDWIDTH SIGNALS

STATEMENT OF GOVERNMENT INTEREST

This invention was made with government support under Contract No. FA8802-09-C-0001 awarded by the Department of the Air Force. The government has certain rights in the invention.

CROSS-REFERENCE TO RELATED APPLICATIONS

This application is related to the following applications, the entire contents of both of which are incorporated by reference herein:

U.S. patent application Ser. No. 13/676,645, filed Nov. 14, 2012 and entitled "Systems and Methods for Reducing Narrow Bandwidth Interference Contained in Broad Bandwidth Signals," now U.S. Pat. No. 8,614,940, and U.S. patent application Ser. No. 14/010,390, filed Aug. 26, 2013 and entitled "Systems and Methods for Reducing Narrow Bandwidth Interference Contained in Broad Bandwidth Signals," now U.S. Pat. No. 8,711,675.

FIELD OF THE INVENTION

This application generally relates to systems and methods for reducing interference contained in signals.

BACKGROUND OF THE INVENTION

A receiver may be configured to receive and process signals that have broad bandwidth spectra and powers within a certain, expected, range. For example, a receiver on a satellite may be configured to receive a group of signals that share a common region of the electromagnetic spectrum, and are multiplexed with one another using techniques known in the art. In the multiplexing technique known as code division multiple access (CDMA), each signal of the group is encoded with a unique code, and spread over the same selected portion of the spectrum as the other signals in the group. The receiver receives the group of signals, and then decodes one or more of the signals from others in the group using a priori knowledge about the unique code(s) of those signals. Alternatively, in the multiplexing technique known as frequency-division multiple access (FDMA), each signal of the group is assigned a different sub-portion of the region of the spectrum than the other signals in the group. The receiver receives and processes the group of signals, and then differentiates one or more of the signals from others in the group using a priori knowledge about the spectral sub-portion(s) of those signals. The groups of signals received in both CDMA and FDMA may be considered "broad bandwidth" signals because the groups of signals occupy a portion of the electromagnetic spectrum that is significantly broader than normally would be used for a single, non-multiplexed signal, that is, a "narrow bandwidth" signal.

In both CDMA and FDMA, the overall power of the group of signals received by the receiver preferably is sufficiently higher than any noise sources that may be present to yield a sufficient signal-to-noise ratio (SNR) to communicate signals with adequate fidelity as measured by BER (Bit Error Rate) values. At the same time, the overall power of the group of signals also preferably is sufficiently low that the receiver may process the signals without distortion. Specifically, as is known in the art, receivers have a linear range of operation and a nonlinear range of operation. If a signal input to the receiver has a power that falls within the linear range of the receiver, then the receiver processes the received signal collection without distortion. However, if a signal input to the receiver has a power that falls within the nonlinear range of the receiver, then the received signal collection is distorted and communication performance is degraded.

Signals other than the desired group of signals that the receiver receives may be referred to as "interference," may be intentional or unintentional, may be directional or nondirectional, and may have a broad bandwidth or a narrow bandwidth. If the receiver receives interference that falls within the same portion of the electromagnetic spectrum as the desired group of signals, then the receiver may not distinguish the interference from the group of signals again degrading communication performance. However, if the power of the interference is sufficiently high that nonlinear receiver operation occurs, not only may the interference obscure desired spectral components but also cause additional signal distortion. This additional receiver distortion may include suppression of desired signals and generation of intermodulation products between design signal components and the interference, resulting in additional degradation in receiver performance.

A receiver may have features intended to reduce the effects of such interference. For example, the receiver may be designed so as to increase its linear range, and thus reduce the risk that interference may cause distortion, e.g., by providing circuitry that remains linear at higher input power levels. However, increasing the linear range of the receiver may be expensive, and also may require a larger power supply to operate the modified circuitry.

Another known approach for reducing the effect of narrow bandwidth interference on reception of a broad bandwidth desired signal uses adaptive notch filter techniques. Specifically, a notch filter may be applied to the received signal prior to amplification so as to block the region of the spectrum where the interference is located. The amplitude, width, and spectral location of the notch filter may be adaptively modified over time by varying weighting coefficients, which may be iteratively derived using a gradient process based on an optimization criterion, such as maximum signal to noise plus interference ratio (SNIR). Such adaptive notch filter techniques have been widely applied. However, its iterative nature makes this approach is relatively slow, and thus less able to respond to rapidly changing interference.

The CDMA signal format is an example of spread spectrum modulation wherein user signals are spread over a much wider bandwidth than needed to convey the information in the user's signal. One advantage of spread spectrum modulation is protection from interference achieved by processing the user-unique codes. Similar interference protection may be achieved in FDMA formats by frequency hopping the user assigned frequency slots over a wide bandwidth in a pseudo-random sequence of frequency hop codes known to both the sender and receiver. Signal error correcting coding and interleaving techniques further add to the interference protection and are commonly used. These interference protection techniques are known in the art, but their benefits depend on linear receiver operation. The effectiveness of these techniques is significantly degraded by receiver nonlinearities.

In addition to negating interference in the spectral domain, e.g., filtering narrow bandwidth interference, interference may also be spatially negated. This spatial processing, commonly referred to as adaptive antenna interference cancellation, combines two or more antenna elements to produce pattern null(s) in the direction of the interference source(s). Such pattern nulls likewise reduce the received interference power. Conventional adaptive antennas use iterative algorithms to establish pattern nulls and like adaptive notch filters, and accordingly cannot sufficiently respond to rapidly changing interference environments.

Thus, what is needed is a method of reducing the effects of interference with broad bandwidth signals while maintaining linear receiver operation.

SUMMARY OF THE INVENTION

Embodiments of the present invention provide systems and methods for reducing narrow bandwidth interference and directional interference contained in broad bandwidth signals. Specifically, embodiments of the present invention may remove relatively high-power interference, which may be narrow bandwidth or directional, or both, contained in broad bandwidth, desired signal beams. For example, Fourier transforms of each of the signal beams may be obtained, then spectral regions that have particularly high power levels may be identified and excised. Following such excision, the excised portions may be used to identify an angular location of the interference and to create a null in a pattern of the beams in the direction of the interference. An inverse Fourier transform of the remaining (non-excised) spectral regions may be obtained, the result of which is a signal having reduced interference. Preferably, the spectral regions to be excised are selected based on the overall power levels of the broad bandwidth desired signal, so as to maintain such power levels within the linear operating range of electronic components to which the processed signal subsequently may be provided.

Under one aspect of the present invention, a system is provided for processing first and second beams respectively received by first and second antennas. Both the first and second beams may include respective levels of interference. The processing of two beams is described for conceptual purposes, and in practice, more than two beams may be processed. The system may include an excision circuit, a directional interference circuit, a combining circuit, and an inverse Fourier transform circuit. The excision circuit may be coupled to the first antenna and may include an analog-to-digital (A/D) converter configured to digitize the first and second beams. The excision circuit further may include a Fourier transform circuit coupled to the A/D converter and configured to obtain respective Fourier transforms of the digitized first and second beams and to respectively provide as outputs first and second sets of spectral bins. Each bin of the first and second sets may have a respective power level; at least some of the bins of the first and second sets may include respective portions of a group of signals; and at least one bin of the first or second set may include the interference. The excision circuit further may include a power analysis circuit configured to respectively compare the collective power levels of each of the first and second sets of spectral bins to a predetermined threshold, and if the collective power level of the first or second set of spectral bins exceeds the predetermined threshold, to excise at least one bin of that set that contains the interference. The directional interference circuit may be coupled to the excision circuit and may be configured to (i) determine an angular location of the interference based on the at least one excised bin, and (ii) select weights to respectively apply to the remaining bins of the first and second sets so as to form a null in a pattern of the first and second beams that is aligned with the determined angular location of the interference. The combining circuit may be coupled to the directional interference circuit and configured to combine the remaining bins of the first and second sets with the selected respective weights. The inverse Fourier transform circuit may be coupled to the combining circuit and configured to obtain an inverse Fourier transform of the combined remaining bins of the first and second sets and to provide as output the digitized group of signals less any excised interference and less any interference excluded by the null.

In some embodiments, the directional interference circuit includes a summing circuit configured to sum the bins respectively excised from the first and second sets of bins as a function of angle between the first and second beams. The directional interference circuit further may include a difference circuit configured to calculate a difference between the bins respectively excised from the first and second sets of bins a function of the angle between the first and second beams. The directional interference circuit further may include a division circuit configured to calculate a ratio of the difference divided by the sum as a function of the angle between the first and second beams. The directional interference circuit further may include an interference location circuit configured to determine the angular location of the interference based on a variation in the ratio as a function of the angle between the first and second beams. The directional interference circuit further may include a weight calculation circuit configured to select the weights to respectively apply to the remaining bins of the first and second sets so as to form the null and to output the selected weights to the combining circuit.

In some embodiments, the A/D converter includes a first A/D converter configured to digitize the first beam and a second A/D converter configured to digitize the second beam. The Fourier transform circuit may include a first Fourier transform circuit configured to obtain the Fourier transform of the digitized first beam and a second Fourier transform circuit configured to obtain the Fourier transform of the digitized second beam. The power analysis circuit may include a first power analysis circuit coupled to the first Fourier transform circuit and a second power analysis circuit coupled to the second Fourier transform circuit.

In some embodiments, the predetermined threshold is selected such that the collective power of each of the first and second bins following excision is sufficiently low to maintain linear operation of the system.

In one illustrative embodiment, the predetermined threshold is fixed.

In some embodiments, the power analysis circuit further is configured to obtain a dynamically defined threshold having a value that, if spectral bins respectively of the first or second sets having power levels exceeding that threshold are excised, would reduce the respective collective power of that set to or below the predetermined threshold. The one or more excised spectral bins may have a power level that exceeds the dynamically defined threshold.

Some embodiments further include a demodulator configured to demodulate the digitized group of signals output by the inverse Fourier transform circuit.

Some embodiments further include an amplifier configured to receive and to amplify the digitized group of signals output by the inverse Fourier transform circuit and an antenna configured to transmit the amplified output.

Under another aspect of the present invention, a method is provided for processing first and second beams respectively received by first and second antennas. Both the first and second beams may include respective levels of interference. The method may include digitizing the first and second beams, and respectively obtaining Fourier transforms of the digitized first and second beams and outputting first and second sets of spectral bins. Each bin of the first and second sets may have a respective power level; at least some of the bins of the first and second sets may include respective portions of a group of signals; and at least one bin of the first or second set may include the interference. The method may include respectively comparing the collective power levels of each of the first and second sets of spectral bins to a predetermined threshold, and if the collective power level of the first or second set of spectral bins exceeds the predetermined threshold, excising at least one bin of that set that contains the interference. The method may include determining an angular location of the interference based on the at least one excised bin; selecting weights to respectively apply to the remaining bins of the first and second sets so as to form a null in a pattern of the first and second beams that is aligned with the determined angular location of the interference; and combining the remaining bins of the first and second sets with the selected respective weights. The method further may include obtaining an inverse Fourier transform of the combined remaining bins of the first and second sets of bins and providing as output the digitized group of signals less any excised interference and less any interference excluded by the null.

In some embodiments, determining the angular location of the interference may include summing the bins respectively excised from the first and second sets of bins as a function of angle between the first and second beams; calculating a difference between the bins respectively excised from the first and second sets of bins as a function of the angle between the first and second beams; calculating a ratio of the difference divided by the sum as a function of the angle between the first and second beams; and determining the angular location of the interference based on the observed ratio as a function of the angle between the first and second beams. Some embodiments further may include selecting the weights to respectively apply to the remaining bins of the first and second sets so as to form the null.

Some embodiments include digitizing the first beam with a first A/D converter and digitizing the second beam with a second A/D converter; obtaining the Fourier transform of the digitized first beam with a first Fourier transform circuit and obtaining the Fourier transform of the digitized second beam with a second Fourier transform circuit; and comparing the collective power levels with a first power analysis circuit coupled to the first Fourier transform circuit and a second power analysis circuit coupled to the second Fourier transform circuit.

In some embodiments, the predetermined threshold is selected such that the collective power of each of the first and second bins following excision is sufficiently low to maintain linear operation of the system. The predetermined threshold may be fixed.

Some embodiments further include obtaining a dynamically defined threshold having a value that, if spectral bins respectively of the first or second set having power levels exceeding that threshold are excised, would reduce the respective collective power of the first or second set to or below the predetermined threshold, wherein the excised spectral bins have power levels that exceed the dynamically defined threshold.

Some embodiments further include demodulating the digitized group of signals output by the inverse Fourier transform circuit.

Some embodiments further include amplifying the digitized group of signals output by the inverse Fourier transform circuit and transmitting the amplified output.

DETAILED DESCRIPTION

Figure 1A:
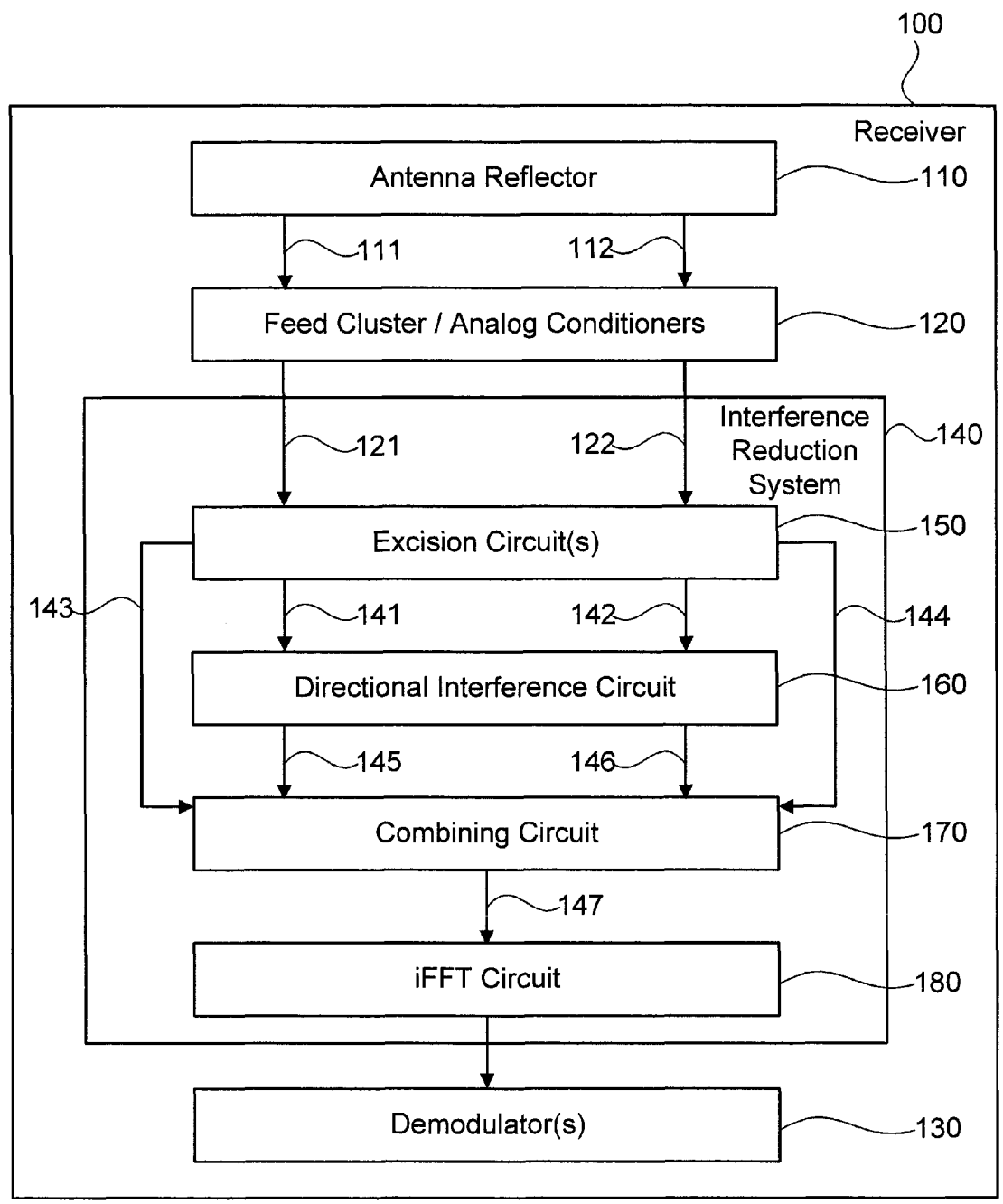
FIG. 1A illustrates a system for reducing interference in a receiver, according to some embodiments of the present invention.

Embodiments of the present invention provide systems and methods for reducing interference, which may be narrow bandwidth or directional, or both, within broad bandwidth signals, such as a group of signals that are multiplexed with each other and that share a common portion of the electromagnetic spectrum. As described above, if a receiver receives both desired broad bandwidth signals and high level narrow bandwidth or directional interference, the composite of the signals and interference may result in nonlinear receiver operation distorting the desired broad bandwidth signals, thus reducing the receiver's ability to retrieve information from the desired signals, e.g., to distinguish the multiplexed signals from one another. The present invention reduces the effect of such interference, by removing spectral components of such interference and by forming beam patterns that exclude such interference, in real-time. Specifically, embodiments of the present invention digitize first and second beams that respectively may include portions of a received signal collection and any interference into quantized levels, and then respectively Fourier transform these digitized beams to obtain first and second sets of spectral bins. Two antenna beams are described herein for conceptual reasons, but in practice, more than two beams may be processed. Each frequency bin has an intensity that corresponds to the composite power of any signal or interference components that fall within the frequency bin. Some, if not all, of the spectral bins contain spectrally resolved portions of the digitized group of signals. Additionally, at least one spectral bin may contains the interference, and indeed multiple bins of one or both sets of spectral bins may contain the interference, depending on the spectral content and angular location of the interference.

Embodiments of the present invention provide that any spectral bins that contain interference may be excised, if such bins contain a particularly high power and if the collective power level of all of the bins in either the first or second sets of spectral bins, together, exceeds a predetermined threshold. Excising interference-containing bins when both of such conditions are met may be useful because if the collective power level of all of the bins in one of the first or second sets of bins is sufficiently low that the receiver operates within its linear range, then any interference present may not necessarily cause additional distortion of the desired signals; additionally, when spread spectrum waveforms are used, the spread spectrum processing advantage may be sufficient to restore signal detection when linear receiver operation prevails. In contrast, if the collective power of the bins in one of the first and second sets of bins is relatively high, e.g., if there is a risk that the receiver may operate within its nonlinear range, then such power level may be used as a signal that interference is present. Appropriate circuitry may identify any interference present in a bin based on the power level of that bin, which may be relatively high as compared to other bins within the respective set of bins. Any bins so identified as having interference may be excised, e.g., set to zero.

The excised bins then may be used to identify an angular location of the interference and to form a null in the pattern of the first and second beams that is aligned with that angular location. For example, the excised bins may be combined in such a manner that permits identification of the angular location of the interference, based upon which weights to be respectively applied to the first and second sets of bins may be determined that would form a null in the pattern of the first and second beams that is aligned with that angular location. The remaining bins of the first and second sets of bins may be combined with such weights, and the resulting combination then inversely Fourier transformed to obtain the digitized signals—less any excised or excluded interference—in the time domain. After high level interference is excised or excluded, the dynamic range of the remaining signal collection is reduced from its previous value when high level interference was present. This reduced dynamic range after excision or exclusion of high level interference advantageously may reduce the power consumption of the electronics following the interference excision, particularly for transponders such as described below with reference to FIG. 1B. Embodiments of the present invention thus may in some circumstances be viewed as a dynamic digital prefilter to maintain linear receiver operation.

First, an overview of the inventive system and components therein will be provided. Then, methods of using such a system, and signals processed thereby, will be described. Lastly, some exemplary applications of embodiments of the present invention will be described.

FIG. 1A illustrates a system 140 for reducing interference, e.g., narrow bandwidth interference, or directional interference, or both, within broad bandwidth signals in a receiver 100, according to some embodiments of the present invention. Specifically, receiver 100 may include antenna reflector 110 configured to receive at least first and second beams, feed cluster/analog conditioners 120 configured to feed cluster and to condition the first and second beams, one or more demodulators 130 configured to decode the information contained within the first and second beams, and interference reduction system 140 disposed therebetween. In the illustrated embodiment, interference reduction system 140 includes one or more excision circuit(s) 150 configured to digitize and to analyze the spectra and power of each of the conditioned first and second beams in the frequency domain, and based on such analysis to excise at least one spectral bin from at least one of the first and second beams that includes interference. Interference reduction system 140 also includes directional interference circuit 160 configured to determine an angular location of the interference based on the excised bin or bins, combining circuit 170 configured to combine the remaining bins of the first and second beams with respective weights selected so as to form a null in a pattern of the first and second beams that is aligned with the determined angular location of the interference, and inverse FFT (iFFT) circuit 180 configured to transform the combined beams output by combining circuit 170 into the time domain. In the embodiment illustrated in FIG. 1A, iFFT circuit 180 may be configured to output the inverse-transformed signals to one or more demodulator(s) 130 of receiver 100.

Antenna reflector 110 illustrated in FIG. 1A may be configured to wirelessly receive at least first and second beams that respectively include portions of a group of signals within a particular frequency band or bands, and respectively to output first and second analog signals 111, 112. For example, antenna reflector 110 may be configured to receive first and second beams that include portions of analog CDMA or FDMA signals that fall within a pre-defined spectral band, and may include one or more filters configured to block signals having frequencies that fall outside of this band. Appropriate antenna designs for a variety of signals in a variety of contexts, e.g., terrestrial, aircraft, or space-based antennas, are known in the art. In some embodiments, antenna reflector 110 may be a pre-existing structure to which interference reduction system 140 may be coupled.

Feed cluster/analog conditioners 120 may be configured to receive analog signals 111, 112 corresponding to the first and second beams and to output conditioned analog signals 121, 122 corresponding to the first and second beams. For example, feed cluster/analog conditioners 120 may include an input RF filter to select the bandwidth containing desired signal components and reject other signals at frequencies outside of that bandwidth, a low noise amplifier to establish the system noise level, and may contain one or more down-converters to translate the RF bandwidth containing the analog signals into the bandwidth over which the interference reduction system 140 operates. Such components may be considered together to constitute analog conditioning circuitry. Receiver 100 can include separate analog conditioners for each of the first and second beams.

Within the exemplary interference reduction system 140 illustrated in FIG. 1A, excision circuit(s) 150 is configured to receive conditioned analog signals 121, 122 respectively corresponding to the first and second beams. As noted above, excision circuit(s) 150 may be configured to digitize and to analyze the spectra and power of each of the conditioned first and second beams in the frequency domain, and based on such analysis to excise at least one spectral bin from at least one of the first and second beams that includes interference. Excision circuit(s) 150 may include a single excision circuit configured as such, or alternatively may include a plurality of excision circuits, each of which is configured to digitize and to analyze the spectra and power of a corresponding one of the conditioned first and second beams in the frequency domain. Note that such a plurality of excision circuits collectively may excise at least one bin that contains the interference, although any given excision circuit may not necessarily excise any bins, depending on the particular power and spectral characteristics of the beam that the circuit is analyzing. In one illustrative embodiment, excision circuit(s) 150 includes a first excision circuit 150' such as illustrated in FIG. 1C configured to analyze conditioned analog signal 121 corresponding to the first beam and to output excised bins 141 to directional interference circuit 160 and remaining bins 143 to combining circuit 170; and a second excision circuit (not specifically illustrated) that is configured analogously to excision circuit 150 to analyze conditioned analog signal 122 corresponding to the second beam and to output excised bins 142 to directional interference circuit 160 and remaining bins 144 to combining circuit 170. Any suitable number and configuration of excision circuits may be provided. For further details on exemplary excision circuits, exemplary components thereof, and exemplary methods of using excision circuits, see U.S. Pat. Nos. 8,614,940 and 8,711,675.

In the illustrative embodiment of FIG. 1C, first excision circuit 150' may include analog-to-digital (A/D) converter 151 configured to receive and digitize conditioned analog signal 121 corresponding to the first beam, fast Fourier transform (FFT) circuit 152 configured to receive and perform an FFT of the digitized signal output by A/D converter 151, and power analysis circuit 153 configured to receive, analyze, and reduce interference contributions to the Fourier transformed signal output by FFT circuit and to output excised bins 141 to directional interference circuit 160 and remaining bins 143 to combining circuit 170.

A/D converter 151 may include a suitable input port configured to be coupled to feed cluster/analog conditioners 120 via a suitable conductive element (input port and conductive element not specifically illustrated). The conductive element may include, for example, a coaxial cable, a transmission line, or any other suitable conductor configured to transmit conditioned analog signal 121, which may be within a pre-defined spectral band, from feed cluster/analog conditioners 120 to A/D converter 151 via the input port. A/D converter 151 preferably is configured to digitize and quantize analog signal 121. As known to those of skill in the art of digital signal processing, A/D converters are commercially available devices that generate a digital version of an analog signal by sampling that signal at a specified rate, and mapping the power levels of that analog signal onto quantization levels in a digital data stream. A/D converters may have a fixed resolution, that is, may have a fixed number of quantization levels onto which it may map the power levels of the analog signal. For example, A/D converters with an 8-bit resolution may be configured to map analog power levels onto 255 quantization levels. A/D converter 151 provides as output to FFT circuit 152 via a suitable conductive element (not specifically illustrated) a digitized, quantized version of first beam, and a digitized, quantized version of any interference that shares the same spectral band as the first beam (e.g., that was not filtered out by feed cluster/analog conditioners 120 nor removed as a product of digitization or quantization).

As is known in the art, a discrete Fourier transform (DFT) may be used to determine the frequency components of a signal that varies in time. An FFT is a particular variant of DFT, in which the input signal has a number of points N that is a power of two, and is Fourier transformed using an algorithm that is particularly efficient at obtaining a DFT of an input signal having a number of points that is a power of two, such as the Cooley-Tukey algorithms known in the art. The output of a DFT is a spectrally resolved version of the input signal, in which different spectral components of the incoming signal are mapped onto a predefined number (e.g., for an FFT, a power of two) of spectral "bins." In some embodiments, the signal output by A/D converter 151 has a number of points N that is a power of two, and FFT circuit 152 is configured to perform an FFT on that signal. Circuits for performing FFTs, as well as other types of Fourier transformations of digital signals, are known in the art and are commercially available. In some embodiments, FFT circuit 152 provides as output a set of spectral bins, at least some of which contain portions of the group of signals within the first beam, and at least one of which may contain interference. Each bin of the first set has a power level corresponding to the summed power levels of any spectral components—be they based on the desired group of signals or based on the interference— that have been mapped to that bin. FFT circuit 152 provides the resulting set of spectral bins, corresponding to the first beam, to a suitable input port of power analysis circuit 153 via a suitable conductive element (input port and conductive element not specifically illustrated).

Preferably, feed cluster/analog conditioners 120, A/D converter 151, and FFT circuitry 152 are configured so as to ensure that linear operation is maintained prior to interference excision for the highest anticipated interference level. Preferably, the analog components (e.g., feed cluster/analog conditioners 120) have a sufficiently high 1 dB compression value relative to the A/D input to maintain linear operation. In practice, the gain distribution may be examined and in some cases, the receiver noise temperature may be increased somewhat by reducing the analog gain values to achieve the required linearity. The clipping levels and quantization used in the digital technology (e.g., A/D converter 151 and FFT circuitry 152) likewise may be selected to avoid digital overflow or nonlinear operation in the digital technology used prior to interference excision.

Power analysis circuit 153 is configured to excise one or more of the spectral bins of the set of spectral bins that it receives from FFT circuit 152 as appropriate, based both on the collective power of the set of bins, and based on the power of each bin individually. By "excise" it is meant that power analysis circuit 153 reduces the power levels of such spectral bins to zero or about zero in some embodiments, or to a predetermined non-zero level in other embodiments. Specifically, power analysis circuit 153 preferably configured to compare the collective power of all of the bins of the set to a predefined threshold, which preferably is based on the linear range of operation of one or more demodulators 130. In one illustrative example, if demodulator 130 is limited to a maximum input signal level to achieve the required demodulation linearity, then the predefined threshold may be established to limit the signal power output from iFFT circuit 180 to demodulator(s) 130 to somewhat less than the maximum demodulator input level, e.g., to 95% or less, or 90% or less, or 85% of less, than the maximum demodulator input level. If power analysis circuit 153 determines that the collective power level of the set of bins exceeds the predetermined threshold, then the circuit may establish a dynamically defined threshold selected to facilitate identification and excision of interference that may be present, while reducing the risk that the desired group of signals within that set of bins also may be excised. To do so, power analysis circuit 153 may determine the amount by which the collective power level of the bins of the set must be reduced to satisfy the predetermined threshold, and then may establish the dynamically defined threshold at such a value that, if bins having powers exceeding that threshold are excised, it would reduce the collective power of the set of bins to or below the predetermined threshold. Power analysis circuit 153 then may excise any bins that exceed the dynamically defined threshold, e.g., by setting the power levels of such bins to zero.

Power analysis circuit 153 may include any suitable circuitry configured to store the predefined threshold, to compare the collective power of the spectral bins to the predefined threshold, to establish the dynamically defined threshold, and to excise any bins that exceed the dynamically defined threshold. For example, in the embodiment illustrated in FIG. 1C, power analysis circuit 153 may include arithmetic circuit A 154, storage medium 155, comparator A 156, arithmetic circuit B 157, and comparator B 158. Arithmetic circuit A 154 may be configured to obtain the set of spectral bins output by FFT circuit 152, e.g., via a suitable conductive element (not specifically illustrated), and to sum the power levels of the spectral bins of that set so as to obtain a collective power level of the bins of that set. Storage medium 155 may be configured to store the predefined threshold. In some embodiments, the predefined threshold is based on the known linearity characteristics of circuitry in demodulator(s) 130, which may be established at the time receiver 100 is designed and constructed. Comparator A 156 may be coupled, e.g., via appropriate conductive elements, to storage medium 155, from which it receives the predefined threshold, and to arithmetic circuit A 154, from which it receives the set of spectral bins as well as the collective power level of the set of spectral bins. Comparator A 156 may be configured to compare the collective power of the set of spectral bins to the predefined threshold.

Comparator A 156 also may be coupled to arithmetic circuit B 157, e.g., via an appropriate conductive element, so as to provide to arithmetic circuit B 157 with the set of spectral bins, as well as a signal indicating the amount (if any) by which the collective power of the set of spectral bins exceeds the predefined threshold. Arithmetic circuit B 157 also may receive the predefined threshold, either from comparator A 156 or from storage medium 155, as is illustrated in FIG. 1C. Arithmetic circuit B 157 preferably is configured to obtain a dynamically defined threshold having a value such that, if bins having powers exceeding that threshold are excised, it would reduce the collective power of the set of bins to or below the predetermined threshold. Arithmetic circuit B 157 is coupled to comparator B 158, e.g., via an appropriate conductive element. Comparator B 158 receives the spectral bins, as well as the dynamically defined threshold from arithmetic circuit B 157. Comparator B 158 is configured to set to excise, e.g., set to zero, any spectral bins that exceed the dynamically defined threshold, and to generate two outputs. Preferably, the first output 141 includes any excised bins of the set of spectral bins corresponding to the first beam, and is provided to directional interference circuit 160 for use in determining the angular location of the interference and in selecting respective weights to apply to the first and second beams so as to form a null in the pattern of the first and second beams that is aligned with the determined angular location of the interference. The second output 143 preferably includes the remaining (non-excised) bins of the set of spectral bins corresponding to the first beam, and is provided to combining circuit 170 for use in combining the first and second beams together with the selected respective weights, e.g., as described below with reference to FIG. 1D. Analogously, excision circuit(s) 150 may include a second excision circuit (not specifically illustrated) that receives signal 122 and that generates output 142 that includes any excised bins of a set of spectral bins corresponding to the second beam and is provided to directional interference circuit 160, and an output that includes the remaining (non-excised) bins of the set of spectral bins corresponding to the second beam and is provided to combining circuit 170.

Note that arithmetic circuits A and B 154, 157, comparators A and B 156, 158, and storage medium 155 may be implemented using any suitable logic circuits known in the art. For example, arithmetic circuits are known in the art and are commercially available, as are comparators and storage media, and suitably may be coupled together with conductive elements. In other embodiments, the functionalities of one or more of arithmetic circuits A and B 154, 157, comparators A and B 156, 158, and/or storage medium 155 may be provided by a suitably programmed field-programmable gate array (FPGA) or application-specific integrated circuit (ASIC). FPGAs and ASICs are commercially available, and methods of programming same to achieve desired logical programming are known in the art. In still other embodiments, the functionalities of one or more of arithmetic circuits A and B 154, 157, comparators A and B 156, 158, and storage medium 155 may be provided by a suitably programmed computer, e.g., a suitably programmed general purpose computer. Additionally, note that circuitry other than arithmetic circuits A and B 154, 157, comparators A and B 156, 158, and storage medium 155 may be used to provide power analysis circuit 153 with functionality analogous to that described herein.

Referring again to FIG. 1A, it should be understood that excision circuit(s) 150 may include any suitable number of suitably configured excision circuits. For example, for embodiments in which antenna reflector 110 of receiver 100 receives a plurality of beams, excision circuit(s) 150 may include a plurality of A/D converters, each configured to digitize a corresponding beam; a plurality of Fourier transform circuits, each coupled to a corresponding A/D converter and configured to obtain a Fourier transform of the corresponding digitized beam; and a plurality of power analysis circuits, each coupled to a corresponding Fourier transform circuit. In one illustrative embodiment, antenna reflector 110 receives first and second beams, and excision circuit(s) 150 include first and second A/D converters, first and second Fourier transform circuits, and first and second power analysis circuits. Alternatively, excision circuit(s) 150 may include a single excision circuit that is configured analogously to first excision circuit 150' but that receives multiple analog signals, e.g., that receives signal 121 corresponding to the first beam and signal 122 corresponding to the second beam, and that is configured to process both the first and second beam in a manner analogous to that described above for first excision circuit 150'. In still another alternative embodiment, excision circuit(s) 150 may include a plurality of A/D converters, each configured to digitize a corresponding beam; a plurality of Fourier transform circuits, each coupled to a corresponding A/D converter and configured to obtain a Fourier transform of the corresponding digitized beam; and a single power analysis circuit coupled to each of the Fourier transform circuits. Other suitable circuit configurations may be used. Additionally, it should be understood that the term "first and second beams" includes two or more beams, e.g., includes three or more beams, or four or more beams, or eight or more beams, and so on, and that any suitable number and configuration of components may be used to excise or exclude interference from such beams.

Directional interference circuit 160 illustrated in FIG. 1A is coupled to excision circuit(s) 150 and receives excised bins therefrom, e.g., receives first output 141 corresponding to the first beam, and second output 142 corresponding to the second beam, for use in determining the angular location of the interference and in selecting respective weights to apply to the first and second beams so as to form a null in the pattern of the first and second beams that is aligned with the determined angular location of the interference.

Figure 1B:
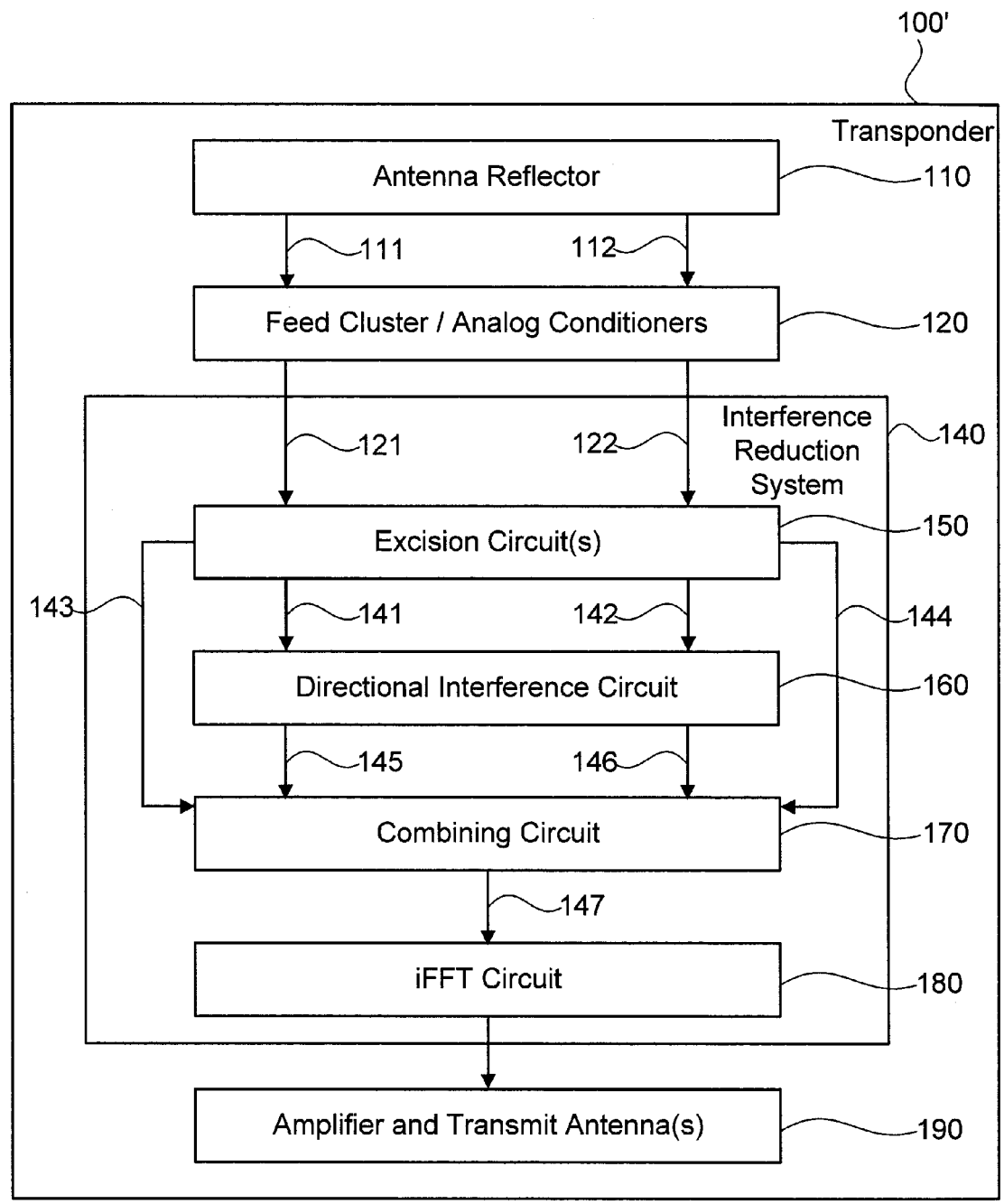
FIG. 1B illustrates a system for reducing interference in a transponder, according to some embodiments of the present invention.
Figure 1C:
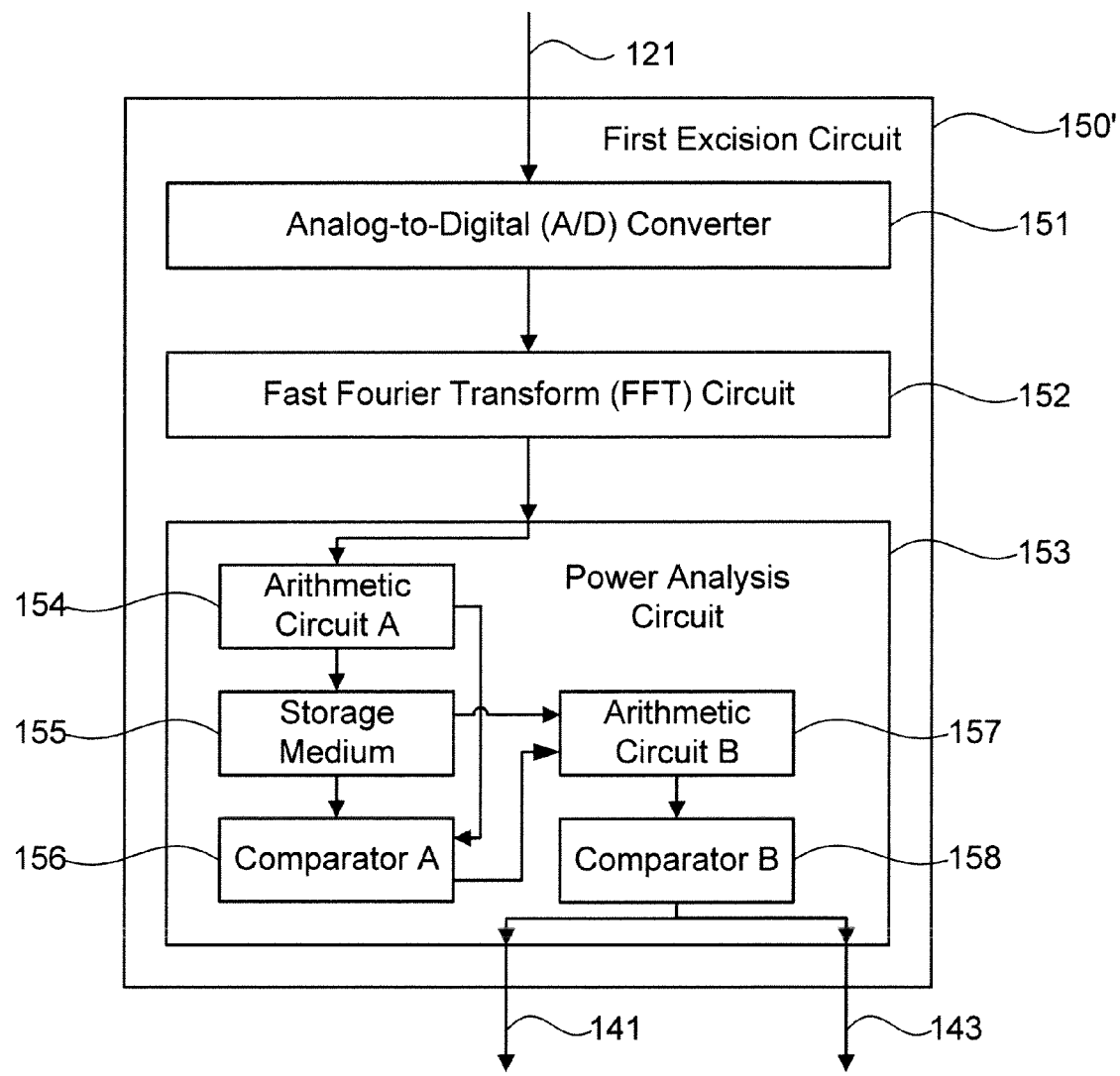
FIG. 1C illustrates a subsystem for excising interference, according to some embodiments of the present invention.
Figure 1D:
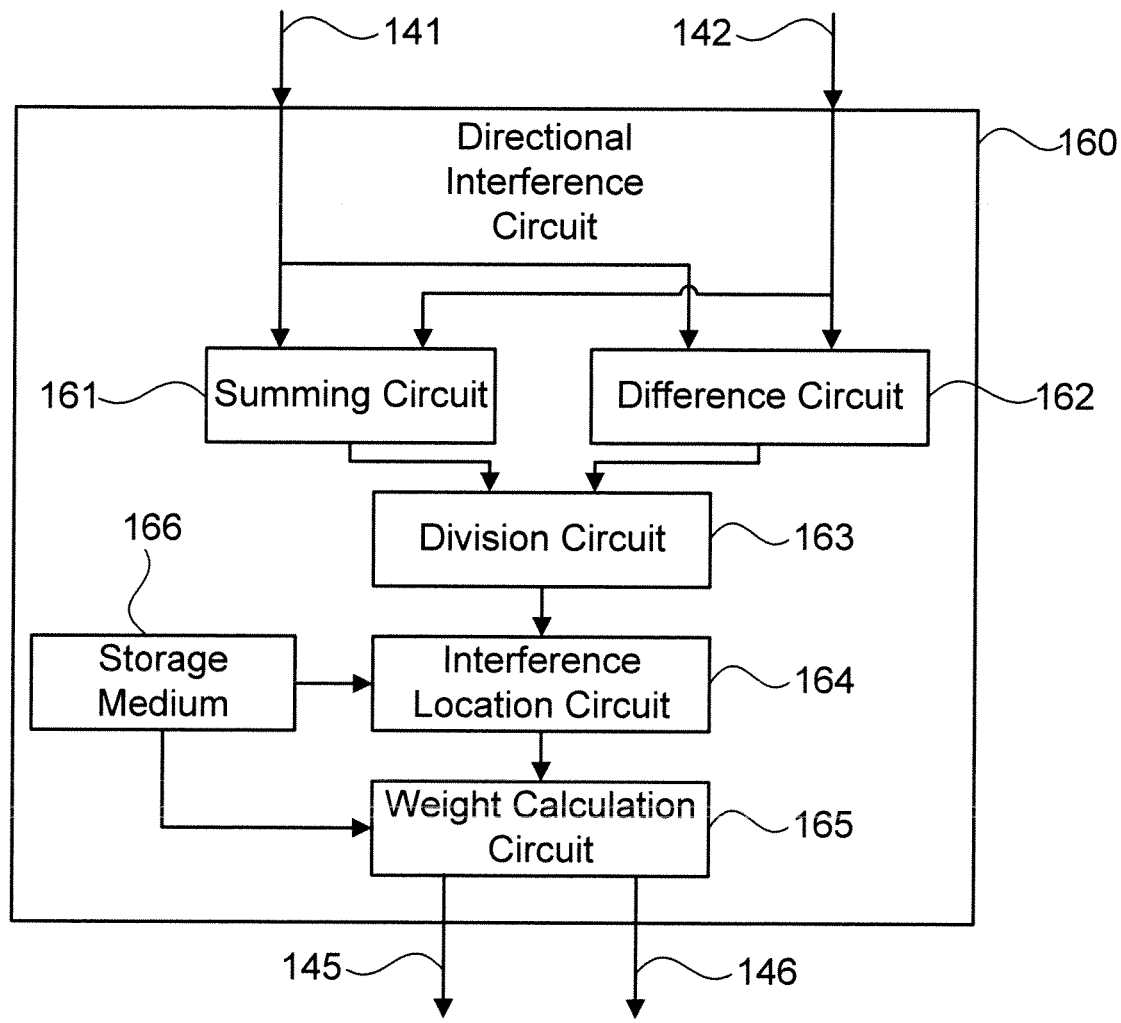
FIG. 1D illustrates a subsystem for excluding interference, according to some embodiments of the present invention.

FIG. 1D illustrates an exemplary configuration of directional interference circuit 160 that includes summing circuit 161, difference circuit 162, division circuit 163, interference location circuit 164, weight calculation circuit 165, and storage medium 166. Summing circuit 161 preferably is configured to receive and to sum the bins 141 excised from the first beam with the bins 142 excised from the second beam on a bin-by-bin basis, as a function of the angle between the first and second beams. Difference circuit 162 preferably is configured to receive and to calculate a difference between the bins 141 excised from the first beam and the bins 142 excised from the second beam on a bin-by-bin basis, as a function of the angle between the first and second beams. Division circuit 163 preferably is configured to receive the sum and the difference and to calculate a ratio of the difference divided by the sum, on a bin-by-bin basis, as a function of the angle between the first and second beams.

Interference location circuit 164 is configured to receive the ratio and to determine the angular location of the interference based on a variation in the ratio as a function of the angle between the first and second beams. For example, as described in greater detail below with reference to FIGS. 5A-5B, antenna reflector 110 may be characterized by an a priori known monopulse error slope corresponding to the ratio of the difference between two non-interference containing beams divided by the sum of those beams, on a bin-by-bin basis, as a function of the angle between the those beams. Storage medium 166 may be configured to store the monopulse error slope for reflector 110, and interference location circuit 164 may be configured to retrieve the monopulse error slope from storage medium 166 and to compare the ratio of the difference divided by the sum for the excised bins to that slope.

Figure 5A:
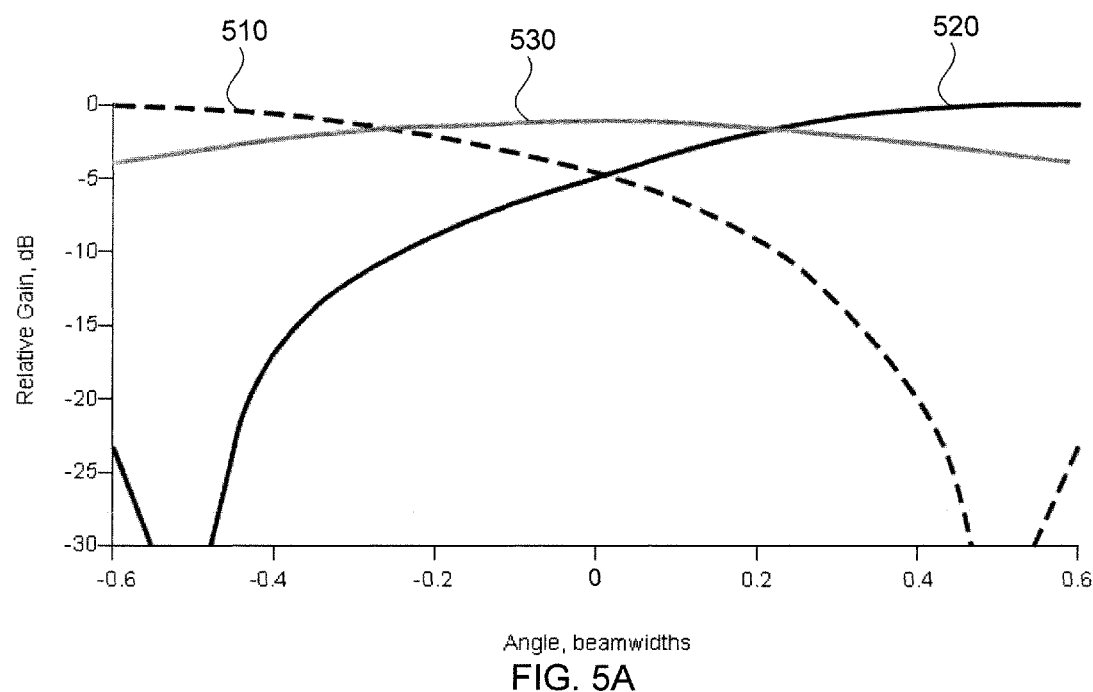
FIG. 5A illustrates an exemplary pattern of first and second beams as a function of angle between the beams, according to some embodiments of the present invention.
Figure 5B:
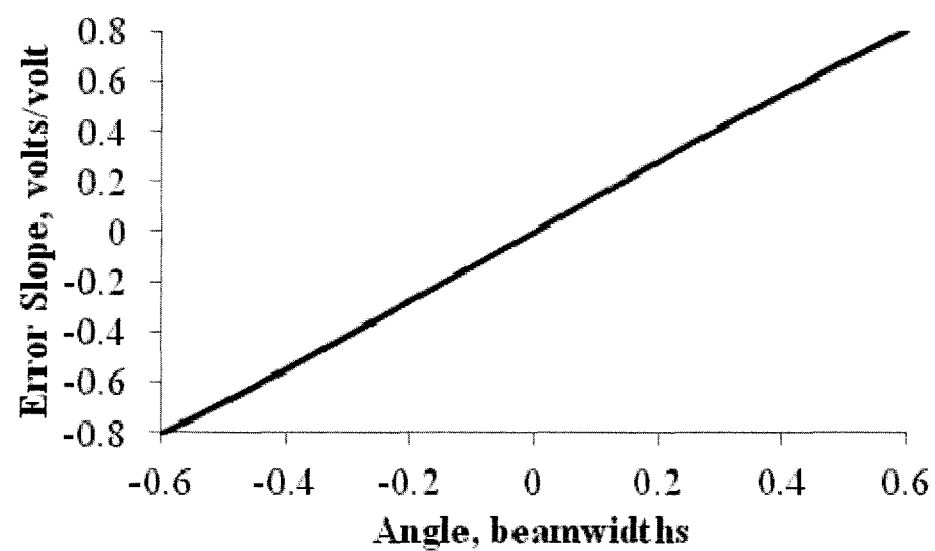
FIG. 5B illustrates a monopulse error slope for the exemplary pattern of FIG. 5A as a function of angle between the beams, according to some embodiments of the present invention.

The interference levels of concern may be sufficiently high that their levels exceed the spread spectrum protection that otherwise may be offered by the user's waveforms or would produce nonlinear system operation, or both. The excision circuitry can identify those frequency bins containing interference components. The sum and difference values of the frequency bins containing the interference components can be dominated by the interference. The ratio of the difference and the sum of the interference bins then can be computed by the division circuit 163. The direction of the interference can be determined by comparing the observed ratio with the a priori predetermined ratio as a function of the angular location between the two beams. This a priori ratio can be referred to as the "monopulse error slope" and an example is illustrated in FIG. 5B, described further below.

Weight calculation circuit 165 is configured to select the weights to respectively apply to the remaining bins of the first and second sets of bins so as to form a null in a pattern of the first and second beams that is aligned with the determined angular location of the interference. For example, weight calculation circuit 165 may receive from interference location circuit 164 a signal representative of the variation between the ratio and the slope as a function of angle between the first and second beams. Based on such variation, weight calculation circuit 165 may determine one or more locations at which a null in a pattern between the first and second beams would exclude the interference, and then may determine and output to combining circuit 170 appropriate weights 145, 146 to respectively apply to the first and second beams so as to generate such a null, e.g., based on a priori known signal characteristics of antenna reflector 110 stored within storage medium 166.

It should be appreciated that summing circuit 161, difference circuit 162, division circuit 163, interference location circuit 164, storage medium 166, and weight calculation circuit 165 may be implemented using any suitable logic circuits known in the art. For example, arithmetic circuits are known in the art and are commercially available, as are comparators and storage media, and suitably may be coupled together with conductive elements. In other embodiments, the functionalities of one or more of summing circuit 161, difference circuit 162, division circuit 163, interference location circuit 164, storage medium 166, and weight calculation circuit 165 may be provided by a suitably programmed field-programmable gate array (FPGA) or application-specific integrated circuit (ASIC). In still other embodiments, the functionalities of one or more of summing circuit 161, difference circuit 162, division circuit 163, interference location circuit 164, storage medium 166, and weight calculation circuit 165 may be provided by a suitably programmed computer, e.g., a suitably programmed general purpose computer. Additionally, note that circuitry other than summing circuit 161, difference circuit 162, division circuit 163, interference location circuit 164, storage medium 166, and weight calculation circuit 165 may be used to provide directional interference circuit 160 with functionality analogous to that described herein.

Referring again to FIG. 1A, combining circuit 170 is configured to receive from directional interference circuit 160 respective weights 145, 146 to apply to the first and second beams so as to generate the null, and also to receive from excision circuit(s) 150 the remaining bins 143, 144 of the first and second sets of bins. Combining circuit 170 is configured to apply weight 145 to bins 143 to obtain a first set of weighted bins, to apply weight 146 to bins 144 to obtain a second set of weighted bins, and to add the first and second sets of weighted bins together on a bin-by-bin basis to obtain an output of combined weighted bins 147. Suitable circuitry for applying weights and combining signals in the frequency domain is commercially available.

Inverse FFT (iFFT) circuit 180 is configured to receive the combined weighted bins 147 output by combining circuit 170 via a suitable input port and conductive element (not specifically illustrated). iFFT circuit 180, which may include any suitable commercially available circuitry, then performs an inverse function to that of FFT circuit 152 illustrated in FIG. 1C, that is, to determine the time components of a signal that varies in frequency, and as such to provide as output a signal that resembles the first and second beams plus interference initially received by antenna reflector 110, but less the interference in any bin whose power was excised by excision circuit 150 or that was excluded by the null formed using directional interference circuit 160 and combining circuit 170. iFFT circuit 180 provides such output to demodulator(s) 130 via a suitable input port and conductive element (not specifically illustrated). Because interference reduction system 140 reduces the amount of interference that demodulator(s) 130 receive, the demodulator(s) are more likely to operate within their linear range(s), and thus less likely to distort the desired group of signals. As such, receiver 100 may more readily distinguish, and obtain information from, the different multiplexed signal components of the desired group of signals from one another than may otherwise be possible without the interference reduction.

In an alternative embodiment, transponder 100' illustrated in FIG. 1B is configured similarly to receiver 100 illustrated in FIG. 1A, but is configured to transmit the inversely Fourier transformed signal to a remote user for remote demodulation, rather than locally demodulating the signal. In transponder 100', iFFT circuit 180 is configured to provide its output to amplifier and transmit antenna(s) 190, e.g. via a suitable input port and conductive element (not specifically illustrated). Amplifier and transmit antenna(s) 190 then amplify and transmit the received signal to one or more individual user(s), each of whom has their own demodulator(s) 130. In such embodiments, the predetermined threshold used by power analysis circuit 153 preferably is based on the linear range of operation of amplifier and transmit antenna(s) 190. For example, if the amplifier and transmit antenna(s) 190 are limited to a total power of 50 Watts or less to achieve linearity, then the predefined threshold may be established to limit the signal power output from iFFT circuit 180 to amplifier and transmit antenna(s) 190 so that the transmitter's exemplary 50 Watt output linearity capability is not exceeded.

The operation of system 100 illustrated in FIGS. 1A-1B now will be described in greater detail with reference to method 200 illustrated in FIG. 2A and submethod 250' illustrated in FIG. 2B, and exemplary signals and information illustrated in FIGS. 3A-5B.

Figure 2A:
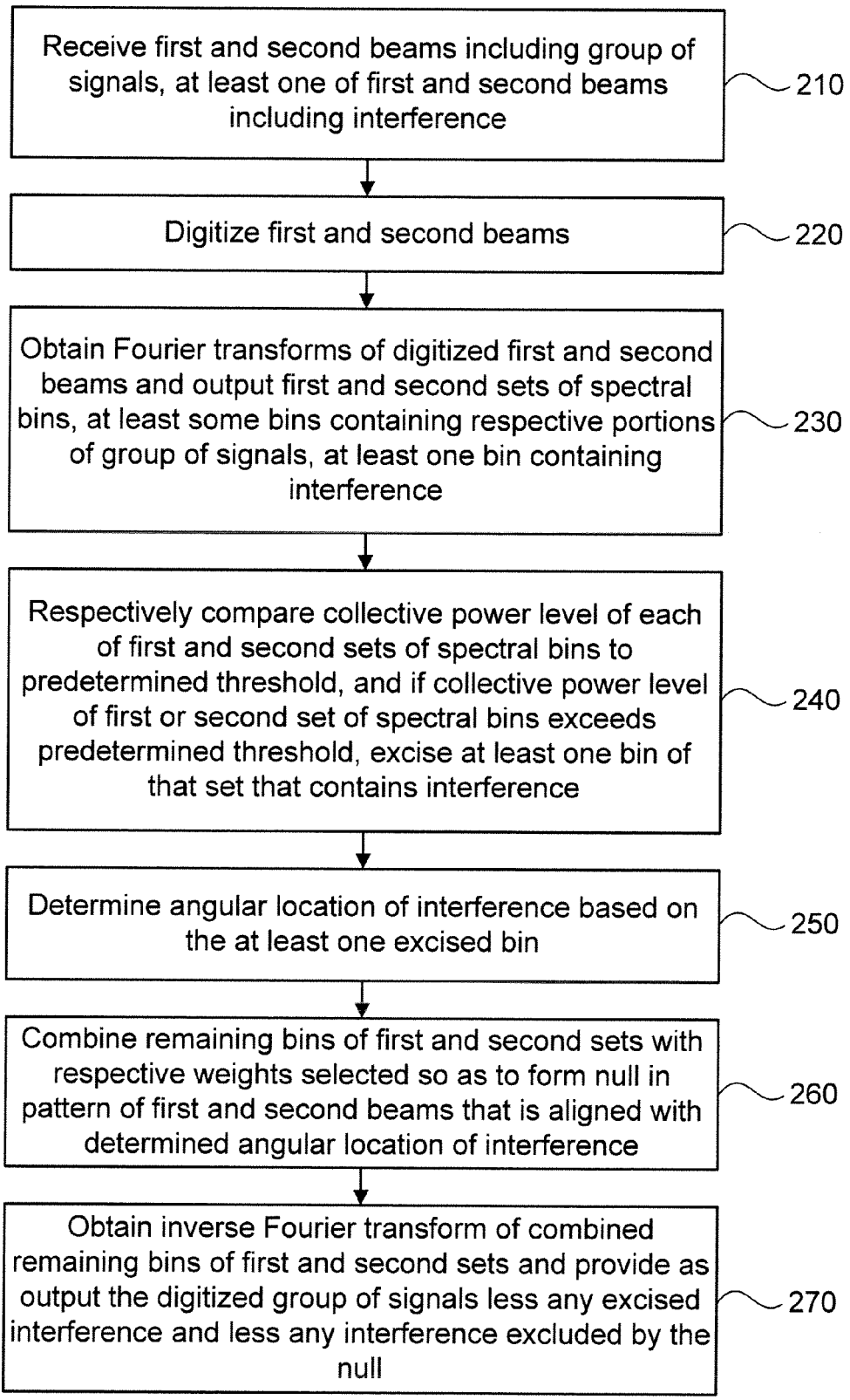
FIG. 2A illustrates a method for reducing interference, according to some embodiments of the present invention.

Method 200 illustrated in FIG. 2A includes receiving first and second beams including a group of signals, at least one of the first and second beams including interference (step 210). For example, as described above with reference to FIG. 1A, antenna reflector 110 may receive the first and second beams and provide the beams to feed cluster/analog conditioners 120 for conditioning using methods known in the art.

Method 200 illustrated in FIG. 2A also includes digitizing the first and second beams (step 220). For example, in the embodiment illustrated in FIG. 1A, excision circuit(s) 150 may include one or more A/D converters configured to receive and to digitize conditioned first beam 121 and conditioned second beam 122. Or, for example, in the embodiment illustrated in FIG. 1C, first excision circuit 150' may include a first A/D converter 151 configured to receive and to digitize conditioned first beam 121, and a second excision circuit (not specifically illustrated) may include a second A/D converter configured to receive and to digitize conditioned second beam 122. However, as noted above, the first and second beams suitably may be digitized using any suitable element or combination of elements that need not necessarily be located within excision circuit(s) 150.

Figure 3A:
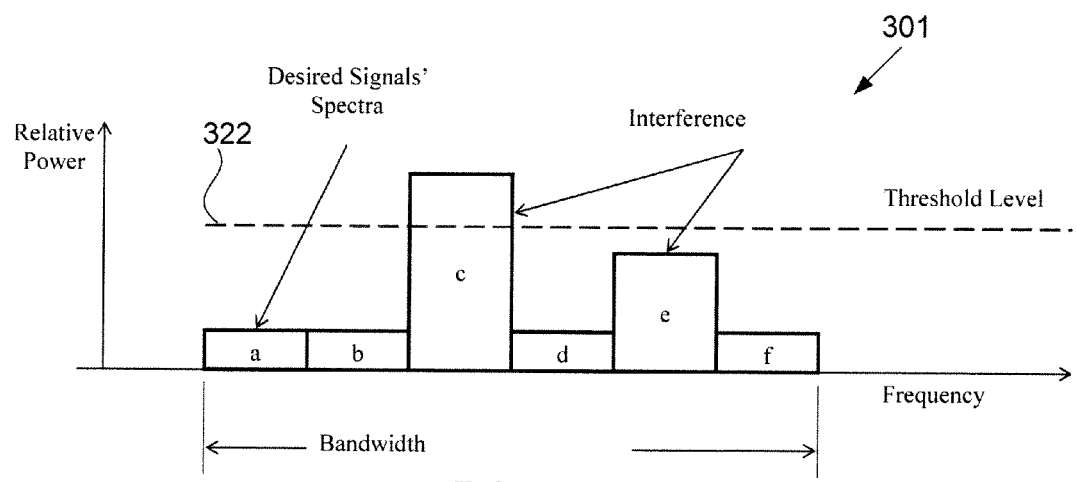
FIG. 3A illustrates a frequency-domain representation of an exemplary group of code division multiple access (CDMA) signals and interference that may be received by the antenna/analog conditioner of a receiver.

Additionally, the first and second beams respectively may include portions of the desired group of signals and any directional interference that occurs within the same bandwidth as does the group of signals. For example, FIG. 3A illustrates a frequency-domain representation of an exemplary group of code division multiple access (CDMA) signals and interference that may be received by the antenna/analog conditioner of a receiver. As illustrated in FIG. 3A, exemplary CDMA signal 301 that may be present in one or both of the first and second beams, sampled at a given period of time, and digitized in a manner such as described further herein may include several different portions a-f having power levels that vary over time. In the example of FIG. 3A, signal 301 includes CDMA signal components distributed across frequency bins a-f across the bandwidth communicating the CDMA signal collection. Additionally, frequency bins c and e include narrow band interference signals whose power levels exceed the power levels of the CDMA signal collection in those bins. The interference power levels may be compared with the threshold level in a manner such as described further herein. The interference power level in frequency bin c exceeds the threshold level and may be excised in a manner such as described further herein. By contrast, the lower interference power level in frequency bin e is less than the threshold level and may not be excised. The remaining spectrum exclusive of the excised frequency bin c then may be processed in the demodulator in FIG. 1A or routed to the remainder of the transponder in FIG. 1B.

As noted above, during step 220 of FIG. 2A, the first and second beams are digitized into quantized levels forming first and second digital data streams, which respectively include portions of the desired group of CDMA signals and one or more of which may include interference. Following transforming the first and second beams into the digital domain, an FFT of each beam is performed (step 230) that transforms that beam at a given instant of time into a respective set of frequency bins spanning the spectrum of the signal at that instant, and the corresponding first and second sets of bins are output. At least some of the bins contain respective portions of the group of signals, and at least one bin may contain interference. In one illustrative embodiment, received signal 301 has a bandwidth of approximately 10 MHz, and is mapped by FFT circuit 152 onto 64 bins, in which case the frequency resolution (the width of each bin) is about 156 kHz.

In one illustrative example, if the instant of time when the FFT is performed over the bandwidth occupied by the CDMA signal collection, the distribution of power levels in the frequency bins in FIG. 3A indicates the power levels of the CDMA system users and in addition, a relatively strong interference component in bin c and a more moderate interference component in frequency bin c. The actual signals in the FFT bins may be contained in a digital data stream and the illustration in FIG. 3A indicates exemplary power levels in those bins at a given instant of time. If the input signal collection exclusively included CDMA signals, the distribution of power levels in the FFT bins would be relatively constant and would be expected to vary with time only as the number of system users changes. However, the distribution of power levels in the frequency bins illustrated in FIG. 3A includes two bins, c and e, that respectively include higher power levels than the remaining bins a, b, d, and f. The bins c and e with the relatively higher power levels include not only the spectral components of the desired CDMA signal collection but also the spectral components of two interfering signals. The illustration in FIG. 3A also includes the dynamically predefined threshold level 322 established by the power analysis circuit 153 as described further below. In FIG. 3A, the power level of bin c exceeds threshold 322, while the power level of bin e does not.

Method 200 of FIG. 2A also includes respectively comparing the collective power level of the first and second sets of spectral bins to a predefined threshold, and if the collective power level of the first or second set of spectral bins exceeds the predetermined threshold, excising at least one bin of that set that contains interference (step 240). For example, power analysis circuit 153 described above with reference to FIG. 1C may receive the first set of spectral bins from FFT circuit 152, and may include circuitry such as arithmetic circuit A 154, storage medium 155, and comparator A 156 that together are configured to obtain the collective power of the received spectral bins of that set, and to compare the collective power level of those bins to a predefined threshold so as to assess whether the set of spectral bins has a power that exceeds the linear range of demodulator(s) 130. For the exemplary signal illustrated in FIG. 3A, arithmetic circuit A 154 may obtain a sum of the power levels in bins a-f, storage medium 155 may store a value representative of the maximum power level at which demodulator(s) 130 may demodulate signal portions within the set of bins with adequate linearity, and comparator A 156 may be configured to compare the sum from arithmetic circuit A 154 to the value from storage medium 155.

In some embodiments, if the collective power of either set of the spectral bins exceeds the predetermined threshold, a threshold for that set may be dynamically defined. Preferably, the dynamically defined threshold has a value that, if the bins having powers exceeding that threshold are excised from the set, the collective power of that set would be reduced to or below the predetermined threshold. For example, as noted above with reference to FIG. 1A, power analysis circuit 153 may include arithmetic circuit B 157 that is configured to establish the dynamically defined threshold in such a manner. For the exemplary spectral bins illustrated in FIG. 3A, bin c has a power level that exceeds dynamically defined threshold 322, while the power level of bin e is less than threshold 322.

Figure 3B:
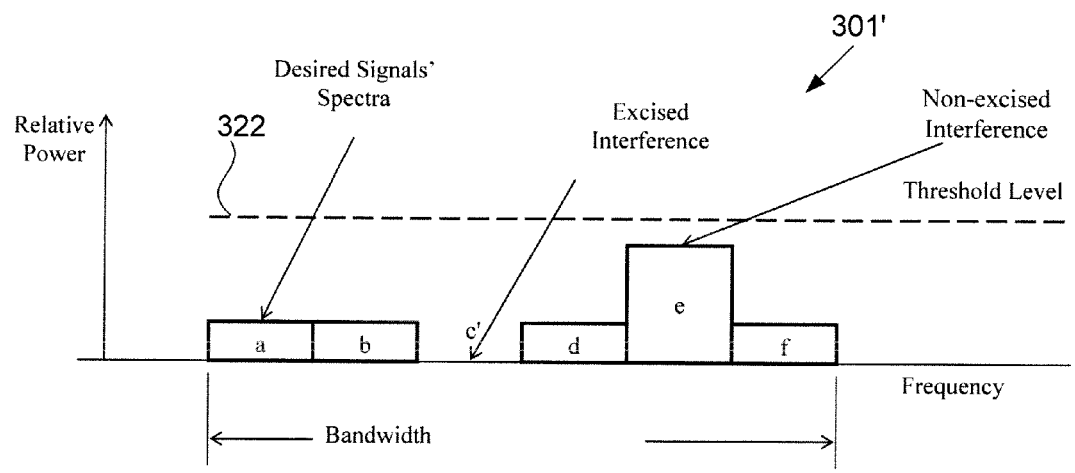
FIG. 3B illustrates the exemplary set of spectral bins of FIG. 3A following excision of at least one bin including interference.

In some embodiments, bins that exceed the dynamically defined threshold may be excised from the set of spectral bins, such as by setting the power level of such bins to zero. For example, power analysis circuit 153 illustrated in FIG. 1A may include comparator B 158 configured to compare the power level of each spectral bin of the set to the dynamically defined threshold, and to reduced to zero the power level of any spectral bin of the set that exceeds the dynamically defined threshold. FIG. 3B illustrates the exemplary set of spectral bins of FIG. 3A following excision of at least one bin including interference. For example, referring to FIG. 3B, it may be seen that the power level of spectral bin c which exceeded dynamically defined threshold 322 in FIG. 3B has been set to zero, thus excising that bin from the set and resulting in modified bin c'. However, although the power level of spectral bin e exceeds that of the remaining bins of the set, bin e in FIG. 3B has not been excised because its power does not exceed dynamically defined threshold 322. The signals at this time instant are contained in a digital data stream that differs from the digital data stream after the A/D 110 by excluding the spectral distribution of the high level interference in frequency bin c but including the spectral distribution of the interference, below the threshold 322, in frequency bin e. The power levels after excision in FIG. 3B represent the spectral components in the set of spectral bins after excision 301'. It should be noted that bin e may contain usable signal information, because the power level of the interference is not significantly greater than that of the desired signal component to which it is added. In this case, the CDMA processing gain can mitigate the lower level interference as is known in the art. Preferably, following the excision of any bins of the set that exceed the dynamically defined threshold, the collective power of the remaining bins of the set is at or below the predetermined threshold, that is, is within the linear range of operation of demodulator(s) 130.

Method 200 of FIG. 2A further includes determining the angular location of the interference based on the at least one excised bin (step 250). FIG. 2B illustrates an exemplary submethod 250' for implementing step 250, although it should be appreciated that other submethods suitably may be used.

Figure 2B:
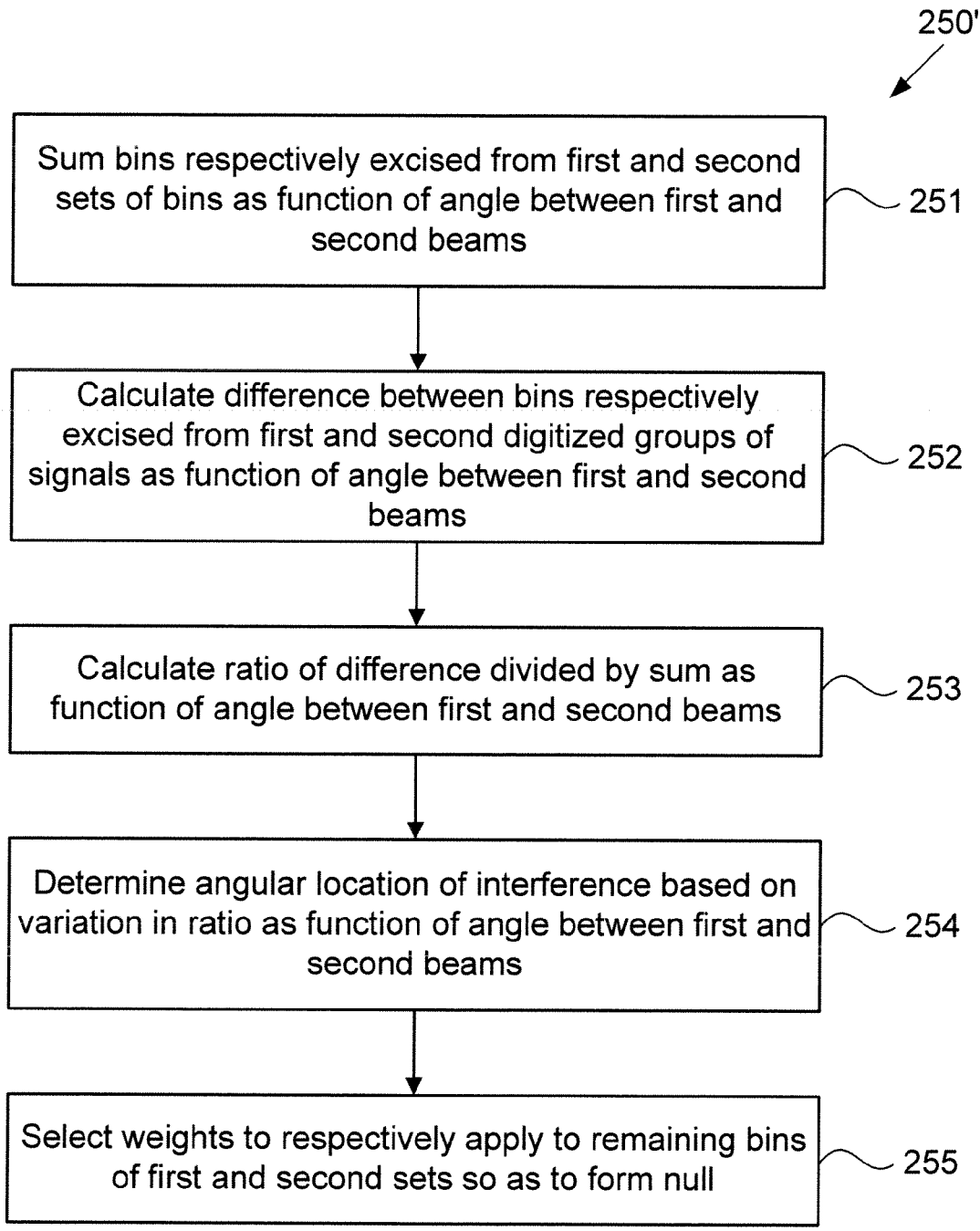
FIG. 2B illustrates a submethod for excluding interference, according to some embodiments of the present invention.

Submethod 250' illustrated in FIG. 2B includes summing the bins that respectively were excised from the first and second sets of bins as a function of the angle between the first and second beams (step 251). Such summing may, for example, be performed on a bin-by-bin basis, e.g., by adding the spectral content of a first bin of the first set of bins to the spectral content of a corresponding first bin of the second set of bins, adding the spectral content of a second bin of the first set of bins to the spectral content of a corresponding second bin of the second set of bins, and so on. In one illustrative embodiment, summing circuit 161 illustrated in FIG. 1D is configured so as to perform step 251.

Submethod 250' illustrated in FIG. 2B also includes calculating a difference between the bins that respectively were excised from the first and second sets of bins as a function of the angle between the first and second beams (step 252). Such difference may, for example, be performed on a bin-by-bin basis in a manner analogous to that described above for the summing of step 251. In one illustrative embodiment, difference circuit 162 illustrated in FIG. 1D is configured so as to perform step 252.

Submethod 250' illustrated in FIG. 2B also includes calculating the ratio of the difference divided by the sum as a function of the angle between the first and second beams (step 253). Such a ratio may, for example, be performed on a bin-by-bin basis in a manner analogous to that described above for the summing of step 251. In one illustrative embodiment, division circuit 163 illustrated in FIG. 1D is configured so as to perform step 253.

Submethod 250' illustrated in FIG. 2B also includes determining the angular location of the interference based on a variation in the ratio as a function of the angle between the first and second beams (step 254). Such a determination may, for example, be performed on a bin-by-bin basis in a manner analogous to that described above for the summing of step 251. In one illustrative embodiment, interference location circuit 164 illustrated in FIG. 1D is configured so as to perform step 254.

As noted above with reference to FIG. 1D, antenna reflector 110 may be characterized by an a priori known monopulse error slope corresponding to the ratio of the difference between two non-interference containing beams divided by the sum of those beams, on a bin-by-bin basis, as a function of the angle between the those beams. More specifically, FIG. 5A illustrates an exemplary pattern of first beam 510 and second beam 520 that may be received by antenna reflector 110 as a function of angle between the beams. In this example, beams 510, 520 have a −4.3 dB tangential crossover level, and the patterns are represented by a sin X/X function. Sum 530 of the two beams, e.g., such as calculated during step 251 of submethod 250', is illustrated in FIG. 5A. The difference between the two beams, e.g., such as calculated during step 252 of submethod 250', is illustrated in FIG. 6 (610).

As noted above, step 253 of submethod 250' includes calculating the ratio of the difference divided by the sum as a function of the angle between the first and second beams. This ratio corresponds to an a priori known monopulse error slope that may be stored and used to detect the angular location of directional interference that may occur in one or more of the beams at a later time. FIG. 5B illustrates the a priori known monopulse error slope for the exemplary beams 510, 520 illustrated in FIG. 5A, as a function of angle between the beams, according to some embodiments of the present invention. It may be seen that the slope is substantially monotonic, and preferably also is substantially linear as a function of the angle between beams 510, 520. However, if interference is present in one or both of the beams, then the ratio of the difference divided by the sum for such beams may detectably vary relative to the a priori known monopulse error slope at one or more points along the x-axis. Accordingly, the angular location of directional interference may be determined by comparing the observed value of the monopulse error slope. Interference that is sufficiently strong to degrade desired signal communication may significantly exceed the desired signal power because of the interference protection provided by the spread spectrum modulation. As a result, the observed error slope value when significant interference power is present may be dominated by the interference power not the desired user signal power. The magnitude of the observed error slope value indicates the angular displacement from the center position between the beams, e.g., an observed error slope value of 0 indicates the angular location of the interference is exactly between the two beams. In an illustrative embodiment, the sign of the observed error slope value indicates the angular location of the interference is either left (negative sign) or right (positive sign) of the center location between the two beams.

Submethod 250' illustrated in FIG. 2B also includes selecting the weights to respectively apply to the remaining bins of the first and second sets so as to form a null in the pattern of the first and second beams that is aligned with the determined angular location of the interference (step 255). Referring again to FIG. 2A, method 200 includes combining the remaining (non-excised) bins of the first and second sets with the respective weights selected so as to form the null in the pattern of the first and second beams that is aligned with the determined angular location of the interference (step 260). For example, in one illustrative embodiment, weight calculation circuit 165 illustrated in FIG. 1D is configured so as to perform step 255 and to provide the selected weights 145, 146 to combining circuit 170 illustrated in FIG. 1A.

Figure 6:
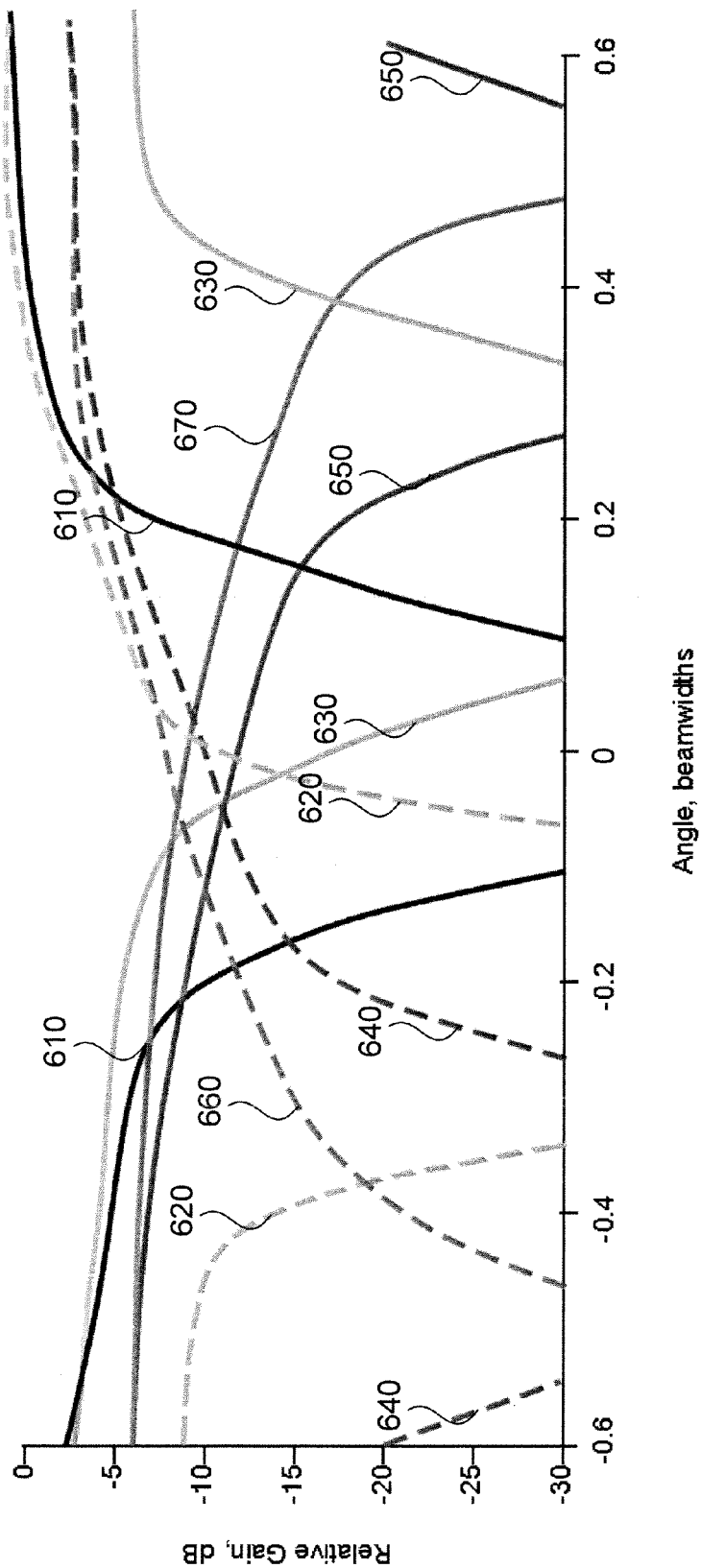
FIG. 6 illustrates exemplary beam patterns that may be formed using some embodiments of the present invention.

FIG. 6 illustrates exemplary nulls that may be formed using step 260 based on weights selected using step 255 of submethod 250'. The particular location of the null is derived from the observed error slope value when significant interference is present. The null can be created by weighting the amplitudes of the first and second beams so that their received signal levels are identical. The weighted beams are then subtracted to produce a pattern null. The beam patterns in FIG. 5A depict beam 510 whose main beam axis is on the right of the center between the two beams and beam 520 located to the left of the center. Also shown in FIG. 5A is the sum beam 530. The values and beam shapes are established during the antenna design and their a priori known values are stored for use in the nulling process. For example, if the angular location of the interference is centered approximately between the two beams, then the difference pattern 610 formed by subtracting the right and left beams 510, 520 with equal weighting may be used. Or, for example, if the angular location of the interference is off-centered and sufficiently overlaps with both of the beams (e.g., within 0.2 beamwidths of the direction centered between the beams), then the beams 510, 520 may be combined with weights selected to align the null with the interference direction. The beam weighting values determined from a priori beam pattern data may include making the levels of the patterns identical at the angle indicated by the observed error slope value so that their subtraction produces a pattern null that is substantially aligned with the interference location.

For example, if the interference is between first and second beams 510, 520 and closer to first beam 510, then pattern 620 or the like may be used, while if the interference is between first and second beams 510, 520 and closer to second beam 520, then pattern 630 or the like may be used. Or, for example, if the interference is between first and second beams 510, 520 and still closer to first beam 510, then the summed beam may be used with beam 510 and the amplitude adjusted to align the pattern null with the interference source to form pattern 640 or the like may be used, while if the interference is between first and second beams 510, 520 and still closer to second beam 520, then the summed beam may be used with beam 520 and the amplitude adjusted to align the pattern null with the interference source to form pattern 650 or the like may be used. Or, for example, if the interference is approximately centered either on beam 510 or 520, then the sum patterns 660 or 670 respectively may be used. An exemplary reason for using the sum beam 530 when the interference is more than 0.2 beamwidths from the center between the two beams is that the levels of beams 520 and 510 respectively may have small values that would require large weighting values. The weighting values may be reduced when the sum beam 530 is used for interference more than roughly 0.2 beamwidths from the center between the two beams. The relatively large weighting values may increase the system noise level, degrading communications.

Method 200 of FIG. 2 further includes performing an inverse Fourier transform on the combined remaining spectral bins of the first and second sets, so as to obtain a digitized group of signals less any interference that was in the excised bins or that was excluded by the null (step 270). For example, as noted above with reference to FIG. 1A, iFFT circuit 180 may perform an iFFT on the output 147 of combining circuit 170, and may provide the output of such iFFT to demodulator(s) 130. The iFFT output may, for example, include a digital data stream containing the information describing the wide bandwidth CDMA spectrum illustrated in FIG. 3D at a given instant of time occurring during portion e illustrated in FIG. 1A. The resulting spectrum after iFFT operations is again a digital data stream that at a given instant of time may have the exemplary power spectral distribution illustrated in FIG. 3B (for CDMA-based embodiments) during the instant of time these operations were performed. Each frequency bin after iFFT operations may follow the time domain signal variation during subsequent time periods.

Note that the spectrum after excision in FIG. 3B has a somewhat reduced desired CDMA signal power that results from the excision. This signal loss is relatively small because the high level interference power has a relatively narrow bandwidth that occupies a relatively small fraction of the frequency bins. In comparison, wide bandwidth high level interference may occupy a larger number of frequency bins that may result in the loss of more desired CDMA signal power. The tolerable amount of signal loss may be based on the link margin and amount of signal energy needed for acceptable signal performance. However, excising high level signal components that result in nonlinear receiver operation may inhibit the additional degradation to communication performance. When linear receiver operation is maintained, the loss in communication performance may be limited to desired signal loss resulting from excision. In addition, the spectral components of the interference whose levels do not exceed the excision threshold also may be present. The processing gain of the CDMA waveform may provide interference protection from relatively low level interference, such as known in the art.

Following steps 210-270 illustrated in FIG. 2A, the resulting signals then may be distinguished from one another, e.g., demultiplexed and decoded using a priori knowledge of the CDMA codes initially used to multiplex the signals with one another. The power requirements of receiver 100 illustrated in FIG. 1A or transponder 100' illustrated in FIG. 1B for performing such processing may be significantly reduced relative to those for processing otherwise similar signals from which interference had not been excised or nulled out, particularly in the case where interference excision is applied to transponder architectures where the transponder's transmitter level must be increased to maintain a linear output.

Note that excising a given bin during step 240 of method 200 illustrated in FIG. 2A not only removes any interference within that bin, but also any spectral components of the desired group of signals within that bin. However, for CDMA-based signals, such excision of desired signal components may have little impact on the receiver's ability later to demultiplex and decode the signal components in the remaining bins. Specifically, as mentioned above and as known in the art, CDMA spreads each signal of the group over the same selected portion of the spectrum as the other signals in the group. As such, excising a subset of that selected portion of the spectrum (the subset being within the excised bin) reduces the overall signal strength of all of the signals in the group, but substantially without reducing the information content of the signals in the group. For example, even if 20% of the selected portion of the selected portion of the spectrum is excised, the overall power of the desired group of signals may be reduced by approximately 1 dB, which may not significantly impact the receiver's ability to demultiplex and decode the signal components in the remaining bins.

However, if the excised interference has sufficiently large bandwidth relative to that of the desired group of signals and also has sufficient power distributed over a number of frequency bins that a relatively large number of frequency bins must be excised to maintain linear system operation, then the overall power of the desired group of signals may be reduced to an extent that may make it difficult to demultiplex and decode the signal components in the remaining bins, thus degrading communication performance. Thus, interference that has sufficiently high levels and is distributed over a large number of frequency bins may not be adequately protected against by excision alone. The additional protection provided by forming pattern nulls in the direction of interference sources may reduce the total interference power to a level that excision may satisfactorily maintain linear system operation and user signal levels. In this case, system users sufficiently angularly separated from the interference source can still communicate, but users in the angular proximity of the interference source may not have sufficient signal power to communicate. The combination of spectral filtering by excision and spatial filtering by pattern nulls jointly may provide significant protection from interference.

Figure 4A:
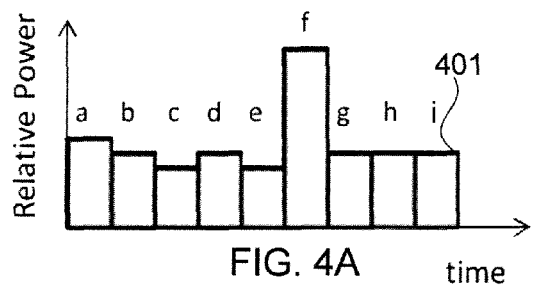
FIG. 4A illustrates an exemplary group of code division multiple access (FDMA) signals and interference that may be received by the antenna/analog conditioner of a receiver, prior to digitization.
Figure 4B:
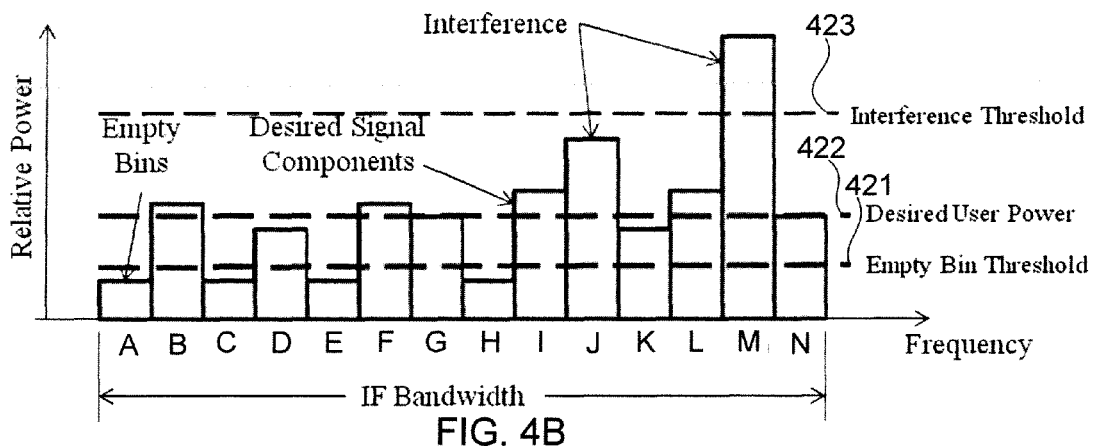
FIG. 4B illustrates an exemplary set of spectral bins following digitization and Fourier transformation of the group of signals and interference of FIG. 4A at an instant of time during portion f illustrated in FIG. 4A.
Figure 4C:
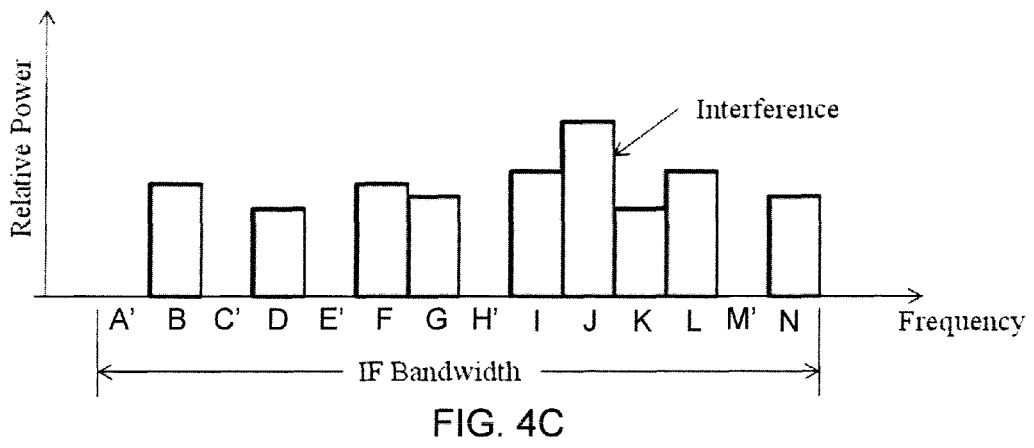
FIG. 4C illustrates the exemplary set of spectral bins of FIG. 4B following excision of bins containing interference.

Additionally, note that CDMA is only one example of a technique that may be used to multiplex a group of signals with one another in a "broad bandwidth" manner, from which interference may be excised using interference reduction system 140 illustrated in FIGS. 1A-1B and method 200 illustrated in FIG. 2A. Another such technique is FDMA, which as mentioned above assigns different signals in the group to different portions of the spectrum than one another. FIGS. 4A-4C illustrate exemplary signals that may be generated using interference reduction system 140 illustrated in FIGS. 1A-1B and method 200 illustrated in FIG. 2A to excise interference from an FDMA signal.

Specifically, FIG. 4A illustrates exemplary FDMA signal 401, portions of which may be present in first and second beams received by antenna reflector 110. FDMA signal 401 within the first beam may include several different portions a-i that vary relative to one another over time and differ from one another, depending on the particular power level for each signal within the frequency bins. Signal 401 also may include interference, as denoted by higher power level portion f.

FIG. 4B illustrates an exemplary distribution of power levels in a first set of frequency bins corresponding to the first beam, following digitization and Fourier transformation of signal 401 within the first beam at an instant during portion f illustrated in FIG. 4A. The output of Fourier transformation of FDMA signal 401 includes a digital stream having a plurality of spectral bins A-N to which different spectral components of signal 401 may be mapped by FFT circuit 152 during step 220 of FIG. 2. As may be seen in FIG. 4B, the power levels in each bin corresponding to the portions of the digital data stream containing the spectral information of that bin's content, the power levels in the various spectral bins may vary relative to one another, with spectral bins J and M having particularly high power levels relative to the others, and thus possibly containing interference. The collective power of the spectral bins of the first set then may be obtained and compared to predefined threshold, e.g., by implementing step 240 illustrated in FIG. 2A using power analysis circuit 153 described above with reference to FIG. 1C. If the collective power of the spectral bins of the first set exceeds the predetermined threshold, then a dynamically defined threshold may be established, as described above with reference to step 240 of FIG. 2A and power analysis circuit 153 described above with reference to FIG. 1C. For the exemplary first set of spectral bins illustrated in FIG. 4B, only bin M has a power level that exceeds dynamically defined threshold 423. FIG. 4C illustrates the first set of spectral bins following excision of bin M in a manner analogous to that described above with reference to step 240 of FIG. 2A as implemented using comparator B 158 described above with reference to FIG. 1A, resulting in modified bin M'. In this regard, it should be noted that bin J may contain usable signal information, because the power level of the interference therein is not significantly greater than that of the desired signal components to which it is added.

In addition, some of the frequency bins of a set of bins may be unpopulated with signal components and be occupied by only noise components that have no communication value. The example in FIG. 4B includes desired FDMA signal components in bins B, D, F, G, I, K, L, and N, and may or may not include desired signal components in bins J and M that are masked by interference. Bins A, C, E, and H illustrated in FIG. 4B contain noise components but substantially no desired FDMA signal components, and thus are denoted as empty bins. The distribution of signal components is illustrated for a given instant of time and varies with operation.

FDMA-based systems may provide communications to a number of users through a transponder architecture and the illustration in FIG. 4B depicts the distribution within the transponder's IF (intermediate frequency) bandwidth. Individual users may receive the entire signal collection communicated by the transponder and select the pre-assigned frequency slot(s) to receive the communications intended for their own use. As discussed above, the transponder's transmitter preferably remains linear, and if high level interference is not excised, the transmitter power output may be increased to remain linear for the highest anticipated interference level, thus incurring a significant increase in power consumption. In cases where interference protection is desired, frequency hopped spread spectrum techniques may be used where the carrier frequency is hopped in a pseudo random pattern known to the transponder's transmitter and system users but not to the interference source. In such cases, the interference source may dilute its resources by distributing the interference over the wider spread spectrum bandwidth or cover a limited portion of that bandwidth and interfere with user communications only part of the time. The exemplary distribution in the set of frequency bins illustrated in FIG. 4B again pertains for an instant of time and preferably covers the hop bandwidth and interference at other times may be outside the hop bandwidth, because the pseudo-random hopping sequence is unknown to the interference source. The degradation to system users when the interference coincides with the hopped bandwidth may be mitigated by error correction coding and interleaving as is known in the art.

As described further above with reference to FIGS. 1A-1C and 2A, power analysis circuit 153 may obtain the collective power of the spectral bins, compare that power level to a predefined threshold, and, if the collective power exceeds that predefined threshold, dynamically establish an interference threshold to determine potential frequency bins having sufficient power to result in nonlinear operation. Thus in the illustrative example in FIG. 4B, frequency bin M containing relatively strong interference at a particular instant of time, e.g., having a power level greater than dynamically defined threshold 423, would be excised, while frequency bin J having a power level less than the dynamically defined threshold 423 would not be excised. As in FIG. 3B, the spectral information in the signal collection illustrated in FIG. 4B is a digital bit stream, and the power levels in the set of frequency bins is used for illustration purposes.

Optionally, additional benefits may be obtained by excising certain spectral bins in addition to those that exceed dynamically defined threshold 423. For example, turning back to FIG. 4B, it may be seen that the power levels of bins B, D, F, G, and I-N are greater than empty bin threshold 421, which designates a power level below which a bin may be considered to carry insufficient information to distinguish, and thus is "empty". Empty bin threshold 421 may be defined, for example, based on a priori knowledge about the system noise level and the variance of its value. That is, each of bins B, D, F, G, and I-N has sufficient power as to permit communications (noting, of course, that bin M also includes high-power interference). By comparison, bins A, C, E, and H have power levels that are below empty bin threshold 421, and may be excised by setting their values to zero, such as illustrated in FIG. 4C, resulting in modified bins A', C', E', and H'. After excision of the high level interference and empty bins that have no communication value, the overall quantization level of the desired group of signals may be reduced allowing communication of the useful information content thereof.

Thus, method 200 illustrated in FIG. 2A optionally includes steps of comparing the power levels of the spectral bins of a set to an empty bin threshold and excising any bins having power levels that are lower than that threshold. Such steps may be executed, e.g., using a comparator to compare the bins' power levels to a threshold stored in a suitable storage medium and to excise from the set of bins any bins having power levels that are lower than that threshold. Such comparator and storage medium may be included in system 100 illustrated in FIG. 1, e.g., by providing dedicated circuitry configured to provide the above-described functionality, or by providing a suitably programmed FPGA, ASIC, or computer, such as described above with reference to FIGS. 1A-1B.

FIG. 4B also depicts another threshold level for desired user signal power. FDMA systems communicate the signals of multiple users that are routed to the transponder's transmitter. This transmitter has a fixed output power so that the transmitted signal level is desired to be maintained in its linear operating range. If a user or group of users raise their power levels, the resulting transmitter power may exceed the linear operating range of the transmitter, causing the communication performance to all users to degrade. Embodiments of the present invention may be used to monitor user power control effectiveness to limit individual user power levels so that all users have an equable portion of the transmitter's power and are not degraded by nonlinear transmitter operation. Specifically, the distribution of user power levels may be obtained based on the power levels in the frequency bins, and thus the digital circuitry used in interference excision advantageously provides a means to monitor the effectiveness of user power control techniques. In the example illustrated in FIG. 4B, users' signal components in frequency bins B, F, I, J, L, and M exceed the desired user power level 422 (noting that bins J and M also contain interference components, which may obscure the users' actual signal levels). Additionally, as may be seen in FIG. 4B, users' signal components in frequency bins A, C-E, H, and K have less than the desired user power level 422, and thus have potentially degraded communication performance (noting that bins A, C, E, and H otherwise may be designated as "empty" as described above). Additionally, users' signal components in frequency bins G and N have approximately the desired user power level 422. The desired user power level 422 for user power control monitoring may be established by a power analysis circuit similar to 153, and which may be used after other frequency bins are excised, e.g., after bins having high interference levels and/or empty bins are excised. In some embodiments, the desired user power level 422 may be established dynamically by summing the power levels in frequency bins that have not been excised so that the transponder's transmitter remains within its linear operating range. After user power deviations from the desired levels are determined, users can be notified to readjust their power levels. For example, bins having power levels that are lower than desired user power level 422 may be identified, and sources of the signal components within those identified bins may be notified that they may increase their power levels so as to improve performance. Likewise, users in frequency bins A, F, I, and L have higher than desired power levels and may be notified to reduce their power levels.

Following excision from the set of any spectral bins having power levels that exceed dynamically defined threshold 423, and optionally of any spectral bins having power levels that are less than empty bin threshold 421, as well as optionally identifying bins having power levels that are higher or lower than desired user power level 422, as well as combining the first and second sets of bins in such a manner as to form a null in the pattern of the first and second beams that is aligned with the angular location of interference, an inverse Fourier transform may be performed on the combined remaining spectral bins so as to obtain a digitized group of signals less any signal contributions and interference that was in the excised bins (step 270 of FIG. 2A). An iFFT circuit 180 such as described above with reference to FIG. 1A may be employed to perform such an inverse Fourier transformation and may provide the output of such transformation to demodulator(s) 130. However, the power levels of interference portion M' and the empty bins A', C', E', and H' illustrated in FIG. 4C, which have no communication value, have been reduced significantly relative to their power levels in FIG. 4B. The overall quantization level of the remaining group of signals, including "empty" bins and remaining interference, is significantly lower than in FIG. 4B, and preferably is within the linear range of demodulator(s) 130. As such, interference reduction system 140 may process the desired group of signals and any remaining interference, which may be of a sufficiently low level as to inhibit distortion of the desired group of signals during amplification.

Directional interference further may be excluded by forming a null in the pattern of the first and second beams, such as provided herein.

The signals of the group then may be distinguished from one another, e.g., demultiplexed using a priori knowledge of the spectral regions to which each of the signals has been assigned. Receiver 100's power requirements for performing such processing may be significantly reduced relative to those for processing otherwise similar signals from which interference had not been excised particularly in transponder architectures.

As compared to the CDMA example described above with reference to FIGS. 3A-3C, in which excising bins from a set of bins resulted in an overall reduction in CDMA signal strength but without loss of information, it should be noted that excising interference-containing bins in FDMA-based signals also may excise any desired signals assigned to spectral regions that fall within the excised bins. However, in such bins, the interference may be sufficiently strong that even without excision it may not necessarily be possible to obtain information from the desired signals, and as such the excision may not necessarily reduce the amount of information that practicably may be obtained from the group of signals. Analogously as in the CDMA case, the combination of frequency hopping, spread spectrum, and interleaving protection in FDMA may limit the effectiveness of interference; this combination may be effective only when the system has a linear response. Additional interference protection can also be obtained by forming pattern nulls in the direction of interference. Analogously as in the CDMA case, the interference reduction resulting from antenna pattern nulls can reduce the number of excised frequency bins needed to maintain linear system operation. Additionally, communication to users in close proximity to interference sources may be degraded by the loss in signal power resulting from the pattern null. The tolerable interference level may be based on the error correction coding and interleaving commonly practiced in the art.

Note that the operation of interference reduction system 140 illustrated in FIGS. 1A-1B, e.g., and the implementation of method 200 illustrated in FIG. 2A to produce signals as exemplified in FIGS. 3A-3E and 4A-4C and nulls such as exemplified in FIG. 6, preferably occurs in "real-time." That is, the components of interference reduction system 140 preferably reduce interference with broad bandwidth signals as those signals arrive based on the relative power levels of the different spectral components of the signal, and immediately thereafter provide the resulting signals to demodulator(s) 130 for processing, as illustrated in FIG. 1A, or to an amplifier and transmit antenna(s) 190 for transmission to a user, as illustrated in FIG. 1B. By comparison, adaptive notch filters and conventional adaptive interference cancellation techniques such as mentioned above may rely on iterative spectral analysis of the interference to derive the adaptive filter's weighting coefficients, potentially resulting in time delays in adjusting to changes when the interference spectrum dynamically varies over time relatively rapidly or in an unpredictable manner.

Note that for FDMA-based signals, interference reduction system 140 may be adapted to provide enhanced functionality in routing signals to various destinations, e.g., analogously to a digital channelizer. For example, communication satellites and terrestrial transponders may use multiple beams (signals) to increase link performance and communication throughput in communicating to an overall coverage area. In such designs, frequency reuse plans wherein adjacent antenna beams are assigned a subband of the overall frequency allocation and groups of FDMA users populate those subbands may be used to reduce mutual interference between adjacent beams. The investment in digital technology in interference reduction system 140 together with digital routers and multiplexers advantageously provides operational flexibility to provide connectivity between users distributed over the collection of antenna beams accessing interference reduction system 140 units connected to each receiving beam to their destination beams that may or may not be in beam locations where the signal originates. However, the demands for communication throughput often are not uniformly distributed over the collection of beams, and users at one beam destination may desire communication to other beam destination(s). For further details, see U.S. Pat. Nos. 8,614,940 and 8,711, 675.

While various illustrative embodiments of the invention are described above, it will be apparent to one skilled in the art that various changes and modifications may be made therein without departing from the invention. For example, interference reduction system 130 may be configured to work with, and to be coupled to, a pre-existing receiver 100 or transponder 100', but need not necessarily be considered to be an integral part of such a receiver or transponder, and indeed suitably may be used with any circuitry that would benefit from interference reduction. The appended claims are intended to cover all such changes and modifications that fall within the true spirit and scope of the invention.

What is claimed:

1. A system for processing first and second beams respectively received by first and second antennas, at least one of the first and second beams including interference, the system comprising:
   (a) an excision circuit coupled to the first antenna and comprising:
      an analog-to-digital (A/D) converter configured to digitize the first and second beams;
      a Fourier transform circuit coupled to the A/D converter and configured to obtain respective Fourier transforms of the digitized first and second beams and to respectively provide as outputs first and second sets of spectral bins, each bin of the first and second sets having a respective power level, at least some of the bins of the first and second sets containing respective portions of a group of signals, and at least one bin of the first or second set containing the interference; and
      a power analysis circuit configured to respectively compare the collective power levels of each of the first and second sets of spectral bins to a predetermined threshold, and if the collective power level of the first or second set of spectral bins exceeds the predetermined threshold, to excise at least one bin of that set that contains the interference;
   (b) a directional interference circuit coupled to the excision circuit and configured to (i) determine an angular location of the interference based on the at least one excised bin and (ii) select weights to respectively apply to the remaining bins of the first and second sets so as to form a null in a pattern of the first and second beams that is aligned with the determined angular location of the interference;
   (c) a combining circuit coupled to the directional interference circuit and configured to combine the remaining bins of the first and second sets with the selected respective weights; and
   (d) an inverse Fourier transform circuit coupled to the combining circuit and configured to obtain an inverse Fourier transform of the combined remaining bins of the first and second sets and to provide as output the digitized group of signals less any excised interference and less any interference excluded by the null.

2. The system of claim 1, wherein the directional interference circuit comprises:
   a summing circuit configured to sum the bins respectively excised from the first and second sets of bins as a function of angle between the first and second beams;
   a difference circuit configured to calculate a difference between the bins respectively excised from the first and second sets of bins as a function of the angle between the first and second beams;
   a division circuit configured to calculate a ratio of the difference divided by the sum as a function of the angle between the first and second beams;

an interference location circuit configured to determine the angular location of the interference based on a variation in the ratio as a function of the angle between the first and second beams; and a weight calculation circuit configured to select the weights to respectively apply to the remaining bins of the first and second sets so as to form the null and to output the selected weights to the combining circuit.

3. The system of claim 1, wherein:

the A/D converter includes a first A/D converter configured to digitize the first beam and a second A/D converter configured to digitize the second beam;

the Fourier transform circuit includes a first Fourier transform circuit coupled to the first A/D converter and configured to obtain the Fourier transform of the digitized first beam and a second Fourier transform circuit coupled to the second A/D converter and configured to obtain the Fourier transform of the digitized second beam; and the power analysis circuit includes a first power analysis circuit coupled to the first Fourier transform circuit and a second power analysis circuit coupled to the second Fourier transform circuit.

4. The system of claim 1, wherein the predetermined threshold is selected such that the collective power of each of the first and second bins following excision is sufficiently low to maintain linear operation of the system.

5. The system of claim 1, wherein the predetermined threshold is fixed.

6. The system of claim 1, wherein the power analysis circuit further is configured to obtain a dynamically defined threshold having a value that, if spectral bins respectively of the first or second sets having power levels exceeding that threshold are excised, would reduce the respective collective power of that set to or below the predetermined threshold, and wherein the one or more excised spectral bins have a power level that exceeds the dynamically defined threshold.

7. The system of claim 1, further comprising a demodulator configured to demodulate the digitized group of signals output by the inverse Fourier transform circuit.

8. The system of claim 1, further comprising an amplifier configured to receive and to amplify the digitized group of signals output by the inverse Fourier transform circuit and an antenna configured to transmit the amplified output.

9. The system of claim 1, where the excision circuit further is configured to excise at least one empty bin of the first or second set of spectral bins.

10. A method for processing first and second beams respectively received by first and second antennas, at least one of the first and second beams including interference, the method comprising:

digitizing the first and second beams;

respectively obtaining Fourier transforms of the digitized first and second beams and outputting first and second sets of spectral bins, each bin of the first and second sets having a respective power level, at least some of the bins of the first and second sets containing respective portions of a group of signals, and at least one bin of the first or second set containing the interference;

respectively comparing the collective power levels of each of the first and second sets of spectral bins to a predetermined threshold, and if the collective power level of the first or second set of spectral bins exceeds the predetermined threshold, excising at least one bin of that set that contains the interference;

determining an angular location of the interference based on the at least one excised bin;

selecting weights to respectively apply to the remaining bins of the first and second sets so as to form a null in a pattern of the first and second beams that is aligned with the determined angular location of the interference;

combining the remaining bins of the first and second sets with the selected respective weights; and obtaining an inverse Fourier transform of the combined remaining bins of the first and second sets of bins and provide as output the digitized group of signals less any excised interference and less any interference excluded by the null.

11. The method of claim 10, wherein determining the angular location of the interference comprises:

summing the bins respectively excised from the first and second sets of bins as a function of angle between the first and second beams;

calculating a difference between the bins respectively excised from the first and second sets of bins as a function of the angle between the first and second beams;

calculating a ratio of the difference divided by the sum as a function of the angle between the first and second beams; and determining the angular location of the interference based on a variation in the ratio as a function of the angle between the first and second beams.

12. The method of claim 10, comprising:

digitizing the first beam with a first A/D converter and digitizing the second beam with a second A/D converter;

obtaining the Fourier transform of the digitized first beam with a first Fourier transform circuit and obtaining the Fourier transform of the digitized second beam with a second Fourier transform circuit; and comparing the collective power levels with a first power analysis circuit coupled to the first Fourier transform circuit and a second power analysis circuit coupled to the second Fourier transform circuit.

13. The method of claim 10, wherein the predetermined threshold is selected such that the collective power of each of the first and second bins following excision is sufficiently low to maintain linear operation of the system.

14. The method of claim 10, wherein the predetermined threshold is fixed.

15. The method of claim 10, further comprising obtaining a dynamically defined threshold having a value that, if spectral bins respectively of the first or second set having power levels exceeding that threshold are excised, would reduce the respective collective power of the first or second set to or below the predetermined threshold, wherein the excised spectral bins have power levels that exceed the dynamically defined threshold.

16. The method of claim 10, further comprising excising at least one empty bin of the first or second set of spectral bins.

17. The method of claim 10, further comprising demodulating the digitized group of signals output by the inverse Fourier transform circuit.

18. The method of claim 10, further comprising amplifying the digitized group of signals output by the inverse Fourier transform circuit and transmitting the amplified output.

19. The method of claim 11, further comprising selecting the weights to respectively apply to the remaining bins of the first and second sets so as to form the null.

* * * * *